US012693381B2

(12) United States Patent
Sicron et al.

(10) Patent No.: US 12,693,381 B2
(45) Date of Patent: Jul. 28, 2026

(54) RADAR APPARATUS, SYSTEM, AND METHOD

(71) Applicant: Intel Corporation, Santa Clara, CA (US)

(72) Inventors: Merav Sicron, Kfar-Saba (IL); Ofer Gueta, Ganei-Tikva (IL); Kfir Mandel, Ramat Gan (IL); Ophir Shabtay, Tsofit (IL); Adi Panzer, Tel Aviv (IL); Ziv Barak, Rishon-LeZion (IL)

(73) Assignee: INTEL CORPORATION, Santa Clara, CA (US)

( * ) Notice: Subject to any disclaimer, the term of this patent is extended or adjusted under 35 U.S.C. 154(b) by 312 days.

(21) Appl. No.: 18/479,011

(22) Filed: Sep. 30, 2023

(65) Prior Publication Data

US 2025/0110209 A1    Apr. 3, 2025

(51) Int. Cl.
*G01S 7/41* (2006.01)
*G01S 7/35* (2006.01)
*G01S 13/931* (2020.01)

(52) U.S. Cl.
CPC .............. *G01S 7/411* (2013.01); *G01S 7/354* (2013.01); *G01S 13/931* (2013.01)

(58) Field of Classification Search
CPC ........ G01S 7/411; G01S 7/354; G01S 13/931; G01S 13/42; G01S 13/584; G01S 7/356
See application file for complete search history.

(56) References Cited

U.S. PATENT DOCUMENTS

| | | | | |
|---|---|---|---|---|
| 9,081,085 B2 * | 7/2015 | Fukuda | ............... | G01S 13/0209 |
| 10,073,171 B2 * | 9/2018 | Bordes | .................... | G01S 13/50 |
| 2020/0191939 A1 * | 6/2020 | Wu | ......................... | G01S 7/354 |
| 2021/0382163 A1 * | 12/2021 | Ney | ........................ | G01S 7/282 |
| 2022/0065991 A1 * | 3/2022 | Zhang | ..................... | G01S 13/42 |
| 2022/0342039 A1 * | 10/2022 | Eschbaumer | ........... | G01S 7/415 |

FOREIGN PATENT DOCUMENTS

WO       2023/191799 A1    10/2023

* cited by examiner

*Primary Examiner* — Yonghong Li
(74) *Attorney, Agent, or Firm* — Shichrur & Co.

(57) ABSTRACT

For example, a radar Radio Head (RH) may be configured to determine Range-Doppler (RD) information corresponding to a plurality of RD bins based on digital radar Receive (Rx) signals representing radar Radio Frequency (RF) Rx signals received by one or more Rx antennas; to detect one or more detected RD bins based on the RD information; to provide filtered RD information including RD information corresponding to the one or more detected RD bins and excluding RD information of one or more excluded RD bins, which are not included in the one or more detected RD bins; and to send the filtered RD information to another processor via a communication interconnect.

19 Claims, 20 Drawing Sheets

RADAR APPARATUS, SYSTEM, AND METHOD

BACKGROUND

Various types of devices and systems, for example, autonomous and/or robotic devices, e.g., autonomous vehicles and robots, may be configured to perceive and navigate through their environment using sensor data of one or more sensor types.

Conventionally, autonomous perception relies heavily on light-based sensors, such as image sensors, e.g., cameras, and/or Light Detection and Ranging (LiDAR) sensors. Such light-based sensors may perform poorly under certain conditions, such as, conditions of poor visibility, or in certain inclement weather conditions, e.g., rain, snow, hail, or other forms of precipitation, thereby limiting their usefulness or reliability.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
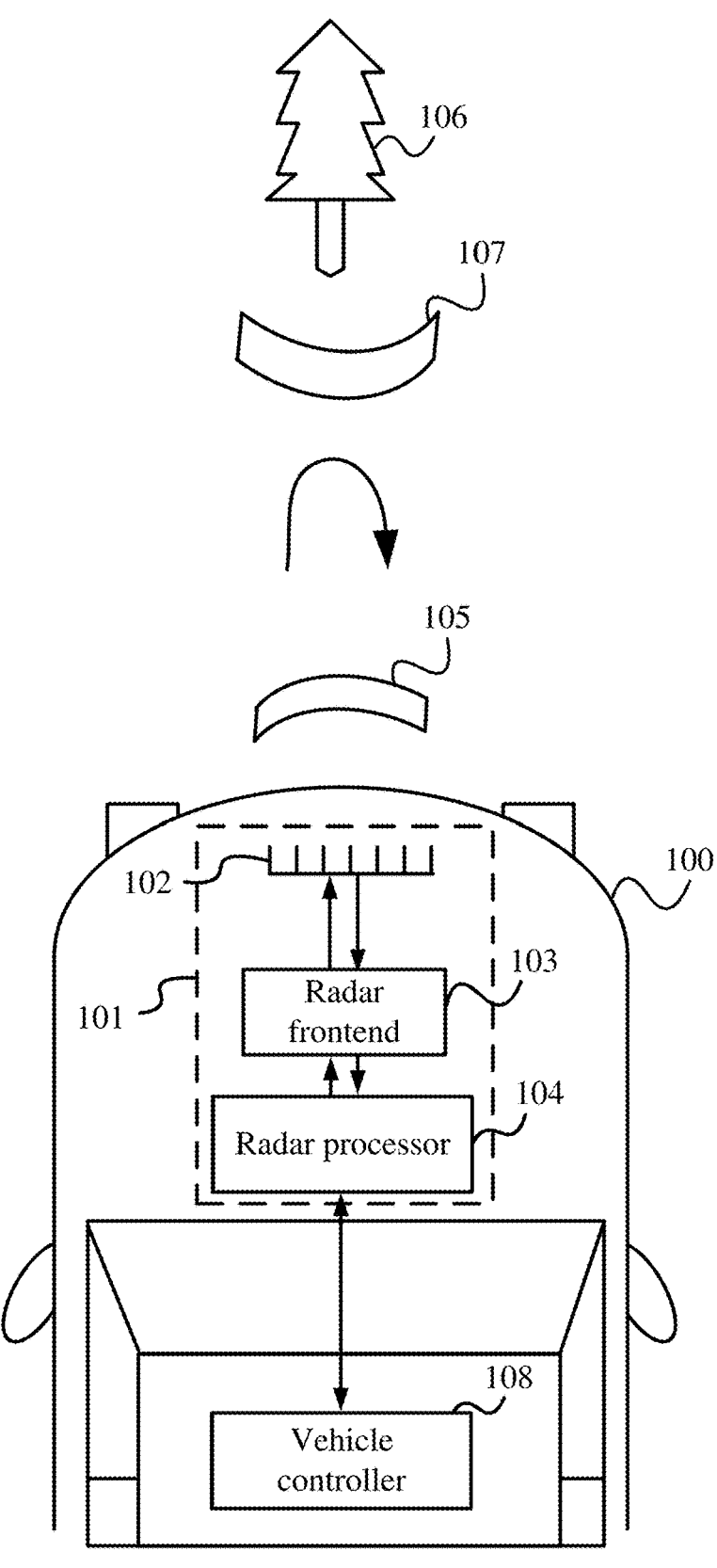
FIG. 1 is a schematic block diagram illustration of a vehicle implementing a radar, in accordance with some demonstrative aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

The words "exemplary" and "demonstrative" are used herein to mean "serving as an example, instance, demonstration, or illustration". Any aspect, aspect, or design described herein as "exemplary" or "demonstrative" is not necessarily to be construed as preferred or advantageous over other aspects, aspects, or designs.

References to "one aspect", "an aspect", "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

The phrases "at least one" and "one or more" may be understood to include a numerical quantity greater than or equal to one, e.g., one, two, three, four, [ . . . ], etc. The phrase "at least one of" with regard to a group of elements may be used herein to mean at least one element from the group consisting of the elements. For example, the phrase "at least one of" with regard to a group of elements may be used herein to mean one of the listed elements, a plurality of one of the listed elements, a plurality of individual listed elements, or a plurality of a multiple of individual listed elements.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and/or may represent any information as understood in the art.

The terms "processor" or "controller" may be understood to include any kind of technological entity that allows handling of any suitable type of data and/or information. The data and/or information may be handled according to one or more specific functions executed by the processor or controller. Further, a processor or a controller may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), and the like, or any combination thereof. Any other kind of implementation of the respective functions, which will be described below in further detail, may also be understood as a processor, controller, or logic circuit. It is understood that any two (or more) processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "memory" is understood as a computer-readable medium (e.g., a non-transitory computer-readable medium) in which data or information can be stored for retrieval. References to "memory" may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" may be used to refer to any type of executable instruction and/or logic, including firmware.

A "vehicle" may be understood to include any type of driven object. By way of example, a vehicle may be a driven object with a combustion engine, an electric engine, a reaction engine, an electrically driven object, a hybrid driven object, or a combination thereof. A vehicle may be, or may include, an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, a rocket, among others.

A "ground vehicle" may be understood to include any type of vehicle, which is configured to traverse the ground, e.g., on a street, on a road, on a track, on one or more rails, off-road, or the like.

An "autonomous vehicle" may describe a vehicle capable of implementing at least one navigational change without driver input. A navigational change may describe or include a change in one or more of steering, braking, acceleration/deceleration, or any other operation relating to movement of the vehicle. A vehicle may be described as autonomous even in case the vehicle is not fully autonomous, for example, fully operational with driver or without driver input. Autonomous vehicles may include those vehicles that can operate under driver control during certain time periods, and without driver control during other time periods. Additionally or alternatively, autonomous vehicles may include vehicles that control only some aspects of vehicle navigation, such as steering, e.g., to maintain a vehicle course between vehicle lane constraints, or some steering operations under certain circumstances, e.g., not under all circumstances, but may leave other aspects of vehicle navigation to the driver, e.g., braking or braking under certain circumstances. Additionally or alternatively, autonomous vehicles may include vehicles that share the control of one or more aspects of vehicle navigation under certain circumstances, e.g., hands-on, such as responsive to a driver input; and/or vehicles that control one or more aspects of vehicle navigation under certain circumstances, e.g., hands-off, such as independent of driver input. Additionally or alternatively, autonomous vehicles may include vehicles that control one or more aspects of vehicle navigation under certain circumstances, such as under certain environmental conditions, e.g., spatial areas, roadway conditions, or the like. In some aspects, autonomous vehicles may handle some or all aspects of braking, speed control, velocity control, steering, and/or any other additional operations, of the vehicle. An autonomous vehicle may include those vehicles that can operate without a driver. The level of autonomy of a vehicle may be described or determined by the Society of Automotive Engineers (SAE) level of the vehicle, e.g., as defined by the SAE, for example in *SAE J3016 2018: Taxonomy and definitions for terms related to driving automation systems for on road motor vehicles*, or by other relevant professional organizations. The SAE level may have a value ranging from a minimum level, e.g., level 0 (illustratively, substantially no driving automation), to a maximum level, e.g., level 5 (illustratively, full driving automation).

An "assisted vehicle" may describe a vehicle capable of informing a driver or occupant of the vehicle of sensed data or information derived therefrom.

The phrase "vehicle operation data" may be understood to describe any type of feature related to the operation of a vehicle. By way of example, "vehicle operation data" may describe the status of the vehicle, such as, the type of tires of the vehicle, the type of vehicle, and/or the age of the manufacturing of the vehicle. More generally, "vehicle operation data" may describe or include static features or static vehicle operation data (illustratively, features or data not changing over time). As another example, additionally or alternatively, "vehicle operation data" may describe or include features changing during the operation of the vehicle, for example, environmental conditions, such as weather conditions or road conditions during the operation of the vehicle, fuel levels, fluid levels, operational parameters of the driving source of the vehicle, or the like. More generally, "vehicle operation data" may describe or include varying features or varying vehicle operation data (illustratively, time varying features or data).

Some aspects may be used in conjunction with various devices and systems, for example, a radar sensor, a radar device, a radar system, a vehicle, a vehicular system, an autonomous vehicular system, a vehicular communication system, a vehicular device, an airborne platform, a waterborne platform, road infrastructure, sports-capture infrastructure, city monitoring infrastructure, static infrastructure platforms, indoor platforms, moving platforms, robot platforms, industrial platforms, a sensor device, a User Equipment (UE), a Mobile Device (MD), a wireless station (STA), a sensor device, a non-vehicular device, a mobile or portable device, and the like.

Some aspects may be used in conjunction with Radio Frequency (RF) systems, radar systems, vehicular radar systems, autonomous systems, robotic systems, detection systems, or the like.

Some demonstrative aspects may be used in conjunction with an RF frequency in a frequency band having a starting frequency above 10 Gigahertz (GHz), for example, a frequency band having a starting frequency between 10 GHz and 120 GHz. For example, some demonstrative aspects may be used in conjunction with an RF frequency having a starting frequency above 30 GHz, for example, above 45 GHZ, e.g., above 60 GHz. For example, some demonstrative aspects may be used in conjunction with an automotive radar frequency band, e.g., a frequency band between 76 GHz and 81 GHz. However, other aspects may be implemented utilizing any other suitable frequency bands, for example, a frequency band above 140 GHz, a frequency band of 300 GHz, a sub Terahertz (THz) band, a THz band, an Infra-Red (IR) band, and/or any other frequency band.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some aspects, some functions associated with the circuitry may be implemented by one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "communicating" as used herein with respect to a signal includes transmitting the signal and/or receiving the signal. For example, an apparatus, which is capable of communicating a signal, may include a transmitter to transmit the signal, and/or a receiver to receive the signal. The verb communicating may be used to refer to the action of transmitting or the action of receiving. In one example, the phrase "communicating a signal" may refer to the action of transmitting the signal by a transmitter, and may not necessarily include the action of receiving the signal by a receiver. In another example, the phrase "communicating a signal" may refer to the action of receiving the signal by a receiver, and may not necessarily include the action of transmitting the signal by a transmitter.

The term "antenna", as used herein, may include any suitable configuration, structure, and/or arrangement of one or more antenna elements, components, units, assemblies, and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a MIMO (Multiple-Input Multiple-Output) array antenna, a single element antenna, a set of switched beam antennas, and/or the like. In one example, an antenna may be implemented as a separate element or an integrated element, for example, as an on-module antenna, an on-chip antenna, or according to any other antenna architecture.

Some demonstrative aspects are described herein with respect to RF radar signals. However, other aspects may be implemented with respect to, or in conjunction with, any other radar signals, wireless signals, IR signals, acoustic signals, optical signals, wireless communication signals, communication scheme, network, standard, and/or protocol. For example, some demonstrative aspects may be implemented with respect to systems, e.g., Light Detection Ranging (LiDAR) systems, and/or sonar systems, utilizing light and/or acoustic signals.

Reference is now made to FIG. 1, which schematically illustrates a block diagram of a vehicle 100 implementing a radar, in accordance with some demonstrative aspects.

In some demonstrative aspects, vehicle 100 may include a car, a truck, a motorcycle, a bus, a train, an airborne vehicle, a waterborne vehicle, a cart, a golf cart, an electric cart, a road agent, or any other vehicle.

In some demonstrative aspects, vehicle 100 may include a radar device 101, e.g., as described below. For example, radar device 101 may include a radar detecting device, a radar sensing device, a radar sensor, or the like, e.g., as described below.

In some demonstrative aspects, radar device 101 may be implemented as part of a vehicular system, for example, a system to be implemented and/or mounted in vehicle 100.

In one example, radar device 101 may be implemented as part of an autonomous vehicle system, an automated driving system, an assisted vehicle system, a driver assistance and/or support system, and/or the like.

For example, radar device 101 may be installed in vehicle 100 for detection of nearby objects, e.g., for autonomous driving.

In some demonstrative aspects, radar device 101 may be configured to detect targets in a vicinity of vehicle 100, e.g., in a far vicinity and/or a near vicinity, for example, using RF and analog chains, capacitor structures, large spiral transformers and/or any other electronic or electrical elements, e.g., as described below.

In one example, radar device 101 may be mounted onto, placed, e.g., directly, onto, or attached to, vehicle 100.

In some demonstrative aspects, vehicle 100 may include a plurality of radar aspects, vehicle 100 may include a single radar device 101.

In some demonstrative aspects, vehicle 100 may include a plurality of radar devices 101, which may be configured to cover a field of view of 360 degrees around vehicle 100.

In other aspects, vehicle 100 may include any other suitable count, arrangement, and/or configuration of radar devices and/or units, which may be suitable to cover any other field of view, e.g., a field of view of less than 360 degrees.

In some demonstrative aspects, radar device 101 may be implemented as a component in a suite of sensors used for driver assistance and/or autonomous vehicles, for example, due to the ability of radar to operate in nearly all-weather conditions.

In some demonstrative aspects, radar device 101 may be configured to support autonomous vehicle usage, e.g., as described below.

In one example, radar device 101 may determine a class, a location, an orientation, a velocity, an intention, a perceptional understanding of the environment, and/or any other information corresponding to an object in the environment.

In another example, radar device 101 may be configured to determine one or more parameters and/or information for one or more operations and/or tasks, e.g., path planning, and/or any other tasks.

In some demonstrative aspects, radar device 101 may be configured to map a scene by measuring targets' echoes (reflectivity) and discriminating them, for example, mainly in range, velocity, azimuth and/or elevation, e.g., as described below.

In some demonstrative aspects, radar device 101 may be configured to detect, and/or sense, one or more objects, which are located in a vicinity, e.g., a far vicinity and/or a near vicinity, of the vehicle 100, and to provide one or more parameters, attributes, and/or information with respect to the objects.

In some demonstrative aspects, the objects may include other vehicles; pedestrians; traffic signs; traffic lights; roads, road elements, e.g., a pavement-road meeting, an edge line; a hazard, e.g., a tire, a box, a crack in the road surface; and/or the like.

In some demonstrative aspects, the one or more parameters, attributes and/or information with respect to the object may include a range of the objects from the vehicle 100, an angle of the object with respect to the vehicle 100, a location of the object with respect to the vehicle 100, a relative speed of the object with respect to vehicle 100, and/or the like.

In some demonstrative aspects, radar device 101 may include a Multiple Input Multiple Output (MIMO) radar device 101, e.g., as described below.

In one example, the MIMO radar device may be configured to utilize "spatial filtering" processing, for example, beamforming and/or any other mechanism, for one or both of Transmit (Tx) signals and/or Receive (Rx) signals.

Some demonstrative aspects are described below with respect to a radar device, e.g., radar device 101, implemented as a MIMO radar. However, in other aspects, radar device 101 may be implemented as any other type of radar utilizing a plurality of antenna elements, e.g., a Single Input Multiple Output (SIMO) radar or a Multiple Input Single output (MISO) radar.

Some demonstrative aspects may be implemented with respect to a radar device, e.g., radar device 101, implemented as a MIMO radar, e.g., as described below. However, in other aspects, radar device 101 may be implemented as any other type of radar, for example, an Electronic Beam Steering radar, a Synthetic Aperture Radar (SAR), adaptive and/or cognitive radars that change their transmission according to the environment and/or ego state, a reflect array radar, or the like.

In some demonstrative aspects, radar device 101 may include an antenna arrangement 102, a radar frontend 103 configured to communicate radar signals via the antenna arrangement 102, and a radar processor 104 configured to generate radar information based on the radar signals, e.g., as described below.

In some demonstrative aspects, radar processor 104 may be configured to process radar information of radar device 101 and/or to control one or more operations of radar device 101, e.g., as described below.

In some demonstrative aspects, radar processor 104 may include, or may be implemented, partially or entirely, by circuitry and/or logic, e.g., one or more processors including circuitry and/or logic, memory circuitry and/or logic. Additionally or alternatively, one or more functionalities of radar processor 104 may be implemented by logic, which may be executed by a machine and/or one or more processors, e.g., as described below.

In one example, radar processor 104 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In other aspects, radar processor 104 may be implemented by one or more additional or alternative elements of vehicle 100.

In some demonstrative aspects, radar frontend 103 may include, for example, one or more (radar) transmitters, and a one or more (radar) receivers, e.g., as described below.

In some demonstrative aspects, antenna arrangement 102 may include a plurality of antennas to communicate the radar signals. For example, antenna arrangement 102 may include multiple transmit antennas in the form of a transmit antenna array, and multiple receive antennas in the form of a receive antenna array. In another example, antenna arrangement 102 may include one or more antennas used both as transmit and receive antennas. In the latter case, the radar frontend 103, for example, may include a duplexer or a circulator, e.g., a circuit to separate transmitted signals from received signals.

In some demonstrative aspects, as shown in FIG. 1, the radar frontend 103 and the antenna arrangement 102 may be controlled, e.g., by radar processor 104, to transmit a radio transmit signal 105.

In some demonstrative aspects, as shown in FIG. 1, the radio transmit signal 105 may be reflected by an object 106, resulting in an echo 107.

In some demonstrative aspects, the radar device 101 may receive the echo 107, e.g., via antenna arrangement 102 and radar frontend 103, and radar processor 104 may generate radar information, for example, by calculating information about position, radial velocity (Doppler), and/or direction of the object 106, e.g., with respect to vehicle 100.

In some demonstrative aspects, radar processor 104 may be configured to provide the radar information to a vehicle controller 108 of the vehicle 100, e.g., for autonomous driving of the vehicle 100.

In some demonstrative aspects, at least part of the functionality of radar processor 104 may be implemented as part of vehicle controller 108. In other aspects, the functionality of radar processor 104 may be implemented as part of any other element of radar device 101 and/or vehicle 100. In other aspects, radar processor 104 may be implemented, as a separate part of, or as part of any other element of radar device 101 and/or vehicle 100.

In some demonstrative aspects, vehicle controller 108 may be configured to control one or more functionalities, modes of operation, components, devices, systems, and/or elements of vehicle 100.

In some demonstrative aspects, vehicle controller 108 may be configured to control one or more vehicular systems of vehicle 100, e.g., as described below.

In some demonstrative aspects, the vehicular systems may include, for example, a steering system, a braking system, a driving system, and/or any other system of the vehicle 100.

In some demonstrative aspects, vehicle controller 108 may configured to control radar device 101, and/or to process one or parameters, attributes and/or information from radar device 101.

In some demonstrative aspects, vehicle controller 108 may be configured, for example, to control the vehicular systems of the vehicle 100, for example, based on radar information from radar device 101 and/or one or more other sensors of the vehicle 100, e.g., Light Detection and Ranging (LIDAR) sensors, camera sensors, and/or the like.

In one example, vehicle controller 108 may control the steering system, the braking system, and/or any other vehicular systems of vehicle 100, for example, based on the information from radar device 101, e.g., based on one or more objects detected by radar device 101.

In other aspects, vehicle controller 108 may be configured to control any other additional or alternative functionalities of vehicle 100.

Some demonstrative aspects are described herein with respect to a radar device 101 implemented in a vehicle, e.g., vehicle 100. In other aspects a radar device, e.g., radar device 101, may be implemented as part of any other element of a traffic system or network, for example, as part of a road infrastructure, and/or any other element of a traffic network or system. Other aspects may be implemented with respect to any other system, environment, and/or apparatus, which may be implemented in any other object, environment, location, or place. For example, radar device 101 may be part of a non-vehicular device, which may be implemented, for example, in an indoor location, a stationary infrastructure outdoors, or any other location.

In some demonstrative aspects, radar device 101 may be configured to support security usage. In one example, radar device 101 may be configured to determine a nature of an operation, e.g., a human entry, an animal entry, an environmental movement, and the like, to identity a threat level of a detected event, and/or any other additional or alternative operations.

Some demonstrative aspects may be implemented with respect to any other additional or alternative devices and/or systems, for example, for a robot, e.g., as described below.

In other aspects, radar device 101 may be configured to support any other usages and/or applications.

Figure 2:
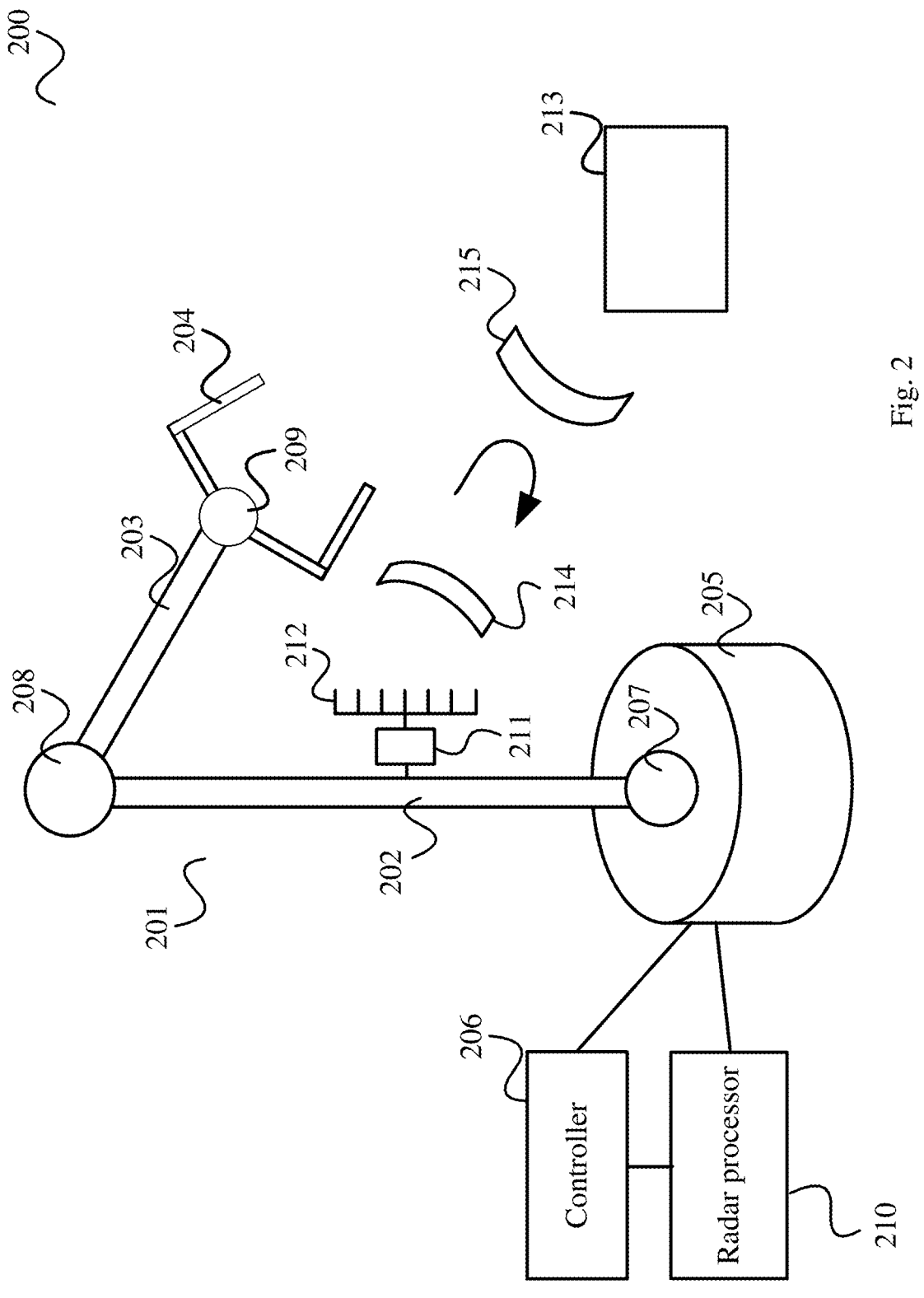
FIG. 2 is a schematic block diagram illustration of a robot implementing a radar, in accordance with some demonstrative aspects.

Reference is now made to FIG. 2, which schematically illustrates a block diagram of a robot 200 implementing a radar, in accordance with some demonstrative aspects.

In some demonstrative aspects, robot 200 may include a robot arm 201. The robot 200 may be implemented, for example, in a factory for handling an object 213, which may be, for example, a part that should be affixed to a product that is being manufactured. The robot arm 201 may include a plurality of movable members, for example, movable members 202, 203, 204, and a support 205. Moving the movable members 202, 203, and/or 204 of the robot arm 201, e.g., by actuation of associated motors, may allow physical interaction with the environment to carry out a task, e.g., handling the object 213.

In some demonstrative aspects, the robot arm 201 may include a plurality of joint elements, e.g., joint elements 207, 208, 209, which may connect, for example, the members 202, 203, and/or 204 with each other, and with the support 205. For example, a joint element 207, 208, 209 may have one or more joints, each of which may provide rotatable motion, e.g., rotational motion, and/or translatory motion, e.g., displacement, to associated members and/or motion of members relative to each other. The movement of the members 202, 203, 204 may be initiated by suitable actuators.

In some demonstrative aspects, the member furthest from the support 205, e.g., member 204, may also be referred to as the end-effector 204 and may include one or more tools, such as, a claw for gripping an object, a welding tool, or the like. Other members, e.g., members 202, 203, closer to the support 205, may be utilized to change the position of the end-effector 204, e.g., in three-dimensional space. For example, the robot arm 201 may be configured to function similarly to a human arm, e.g., possibly with a tool at its end.

In some demonstrative aspects, robot 200 may include a (robot) controller 206 configured to implement interaction with the environment, e.g., by controlling the robot arm's actuators, according to a control program, for example, in order to control the robot arm 201 according to the task to be performed.

In some demonstrative aspects, an actuator may include a component adapted to affect a mechanism or process in response to being driven. The actuator can respond to commands given by the controller 206 (the so-called activation) by performing mechanical movement. This means that an actuator, typically a motor (or electromechanical converter), may be configured to convert electrical energy into mechanical energy when it is activated (i.e. actuated).

In some demonstrative aspects, controller 206 may be in communication with a radar processor 210 of the robot 200.

In some demonstrative aspects, a radar fronted 211 and a radar antenna arrangement 212 may be coupled to the radar processor 210. In one example, radar fronted 211 and/or radar antenna arrangement 212 may be included, for example, as part of the robot arm 201.

In some demonstrative aspects, the radar frontend 211, the radar antenna arrangement 212 and the radar processor 210 may be operable as, and/or may be configured to form, a radar device. For example, antenna arrangement 212 may be configured to perform one or more functionalities of antenna arrangement 102 (FIG. 1), radar frontend 211 may be configured to perform one or more functionalities of radar frontend 103 (FIG. 1), and/or radar processor 210 may be configured to perform one or more functionalities of radar processor 104 (FIG. 1), e.g., as described above.

In some demonstrative aspects, for example, the radar frontend 211 and the antenna arrangement 212 may be controlled, e.g., by radar processor 210, to transmit a radio transmit signal 214.

In some demonstrative aspects, as shown in FIG. 2, the radio transmit signal 214 may be reflected by the object 213, resulting in an echo 215.

In some demonstrative aspects, the echo 215 may be received, e.g., via antenna arrangement 212 and radar frontend 211, and radar processor 210 may generate radar information, for example, by calculating information about position, speed (Doppler) and/or direction of the object 213, e.g., with respect to robot arm 201.

In some demonstrative aspects, radar processor 210 may be configured to provide the radar information to the robot controller 206 of the robot arm 201, e.g., to control robot arm 201. For example, robot controller 206 may be configured to control robot arm 201 based on the radar information, e.g., to grab the object 213 and/or to perform any other operation.

Figure 3:
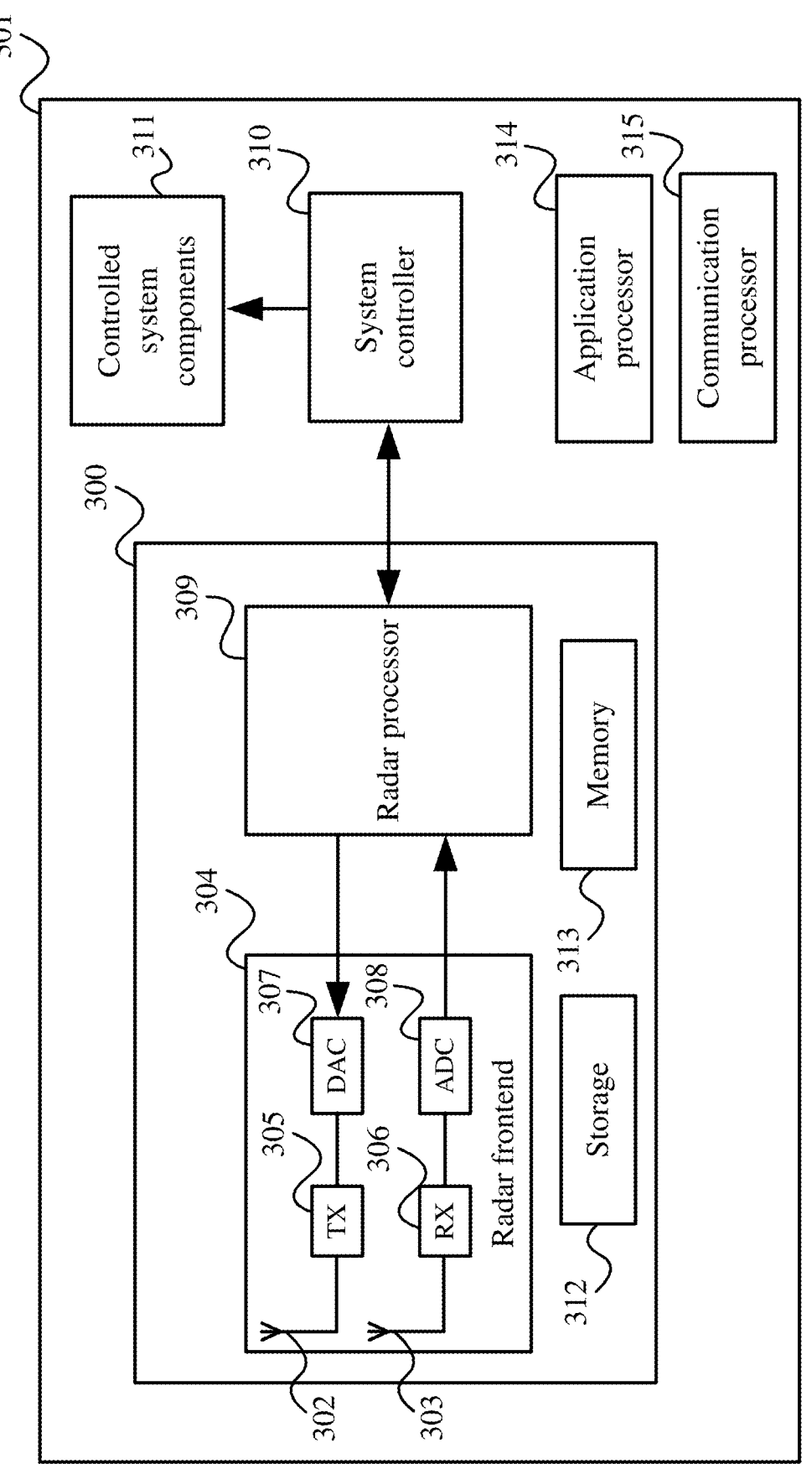
FIG. 3 is a schematic block diagram illustration of a radar apparatus, in accordance with some demonstrative aspects.

Reference is made to FIG. 3, which schematically illustrates a radar apparatus 300, in accordance with some demonstrative aspects.

In some demonstrative aspects, radar apparatus 300 may be implemented as part of a device or system 301, e.g., as described below.

For example, radar apparatus 300 may be implemented as part of, and/or may configured to perform one or more operations and/or functionalities of, the devices or systems described above with reference to FIG. 1 an/or FIG. 2. In other aspects, radar apparatus 300 may be implemented as part of any other device or system 301.

In some demonstrative aspects, radar device 300 may include an antenna arrangement, which may include one or more transmit antennas 302 and one or more receive antennas 303. In other aspects, any other antenna arrangement may be implemented.

In some demonstrative aspects, radar device 300 may include a radar frontend 304, and a radar processor 309.

In some demonstrative aspects, as shown in FIG. 3, the one or more transmit antennas 302 may be coupled with a transmitter (or transmitter arrangement) 305 of the radar frontend 304; and/or the one or more receive antennas 303 may be coupled with a receiver (or receiver arrangement) 306 of the radar frontend 304, e.g., as described below.

In some demonstrative aspects, transmitter 305 may include one or more elements, for example, an oscillator, a power amplifier and/or one or more other elements, configured to generate radio transmit signals to be transmitted by the one or more transmit antennas 302, e.g., as described below.

In some demonstrative aspects, for example, radar processor 309 may provide digital radar transmit data values to the radar frontend 304. For example, radar frontend 304 may include a Digital-to-Analog Converter (DAC) 307 to convert the digital radar transmit data values to an analog transmit signal. The transmitter 305 may convert the analog transmit signal to a radio transmit signal which is to be transmitted by transmit antennas 302.

In some demonstrative aspects, receiver 306 may include one or more elements, for example, one or more mixers, one or more filters and/or one or more other elements, configured to process, down-convert, radio signals received via the one or more receive antennas 303, e.g., as described below.

In some demonstrative aspects, for example, receiver 306 may convert a radio receive signal received via the one or more receive antennas 303 into an analog receive signal. The radar frontend 304 may include an Analog-to-Digital Converter (ADC) 308 to generate digital radar reception data values based on the analog receive signal. For example, radar frontend 304 may provide the digital radar reception data values to the radar processor 309.

In some demonstrative aspects, radar processor 309 may be configured to process the digital radar reception data values, for example, to detect one or more objects, e.g., in an environment of the device/system 301. This detection may include, for example, the determination of information including one or more of range, speed (Doppler), direction, and/or any other information, of one or more objects, e.g., with respect to the system 301.

In some demonstrative aspects, radar processor 309 may be configured to provide the determined radar information to a system controller 310 of device/system 301. For example, system controller 310 may include a vehicle controller, e.g., if device/system 301 includes a vehicular device/system, a robot controller, e.g., if device/system 301 includes a robot device/system, or any other type of controller for any other type of device/system 301.

In some demonstrative aspects, system controller 310 may be configured to control one or more controlled system components 311 of the system 301, e.g. a motor, a brake, steering, and the like, e.g. by one or more corresponding actuators.

In some demonstrative aspects, radar device 300 may include a storage 312 or a memory 313, e.g., to store information processed by radar 300, for example, digital radar reception data values being processed by the radar processor 309, radar information generated by radar processor 309, and/or any other data to be processed by radar processor 309.

In some demonstrative aspects, device/system 301 may include, for example, an application processor 314 and/or a communication processor 315, for example, to at least partially implement one or more functionalities of system controller 310 and/or to perform communication between system controller 310, radar device 300, the controlled system components 311, and/or one or more additional elements of device/system 301.

In some demonstrative aspects, radar device 300 may be configured to generate and transmit the radio transmit signal in a form, which may support determination of range, speed, and/or direction, e.g., as described below.

For example, a radio transmit signal of a radar may be configured to include a plurality of pulses. For example, a pulse transmission may include the transmission of short high-power bursts in combination with times during which the radar device listens for echoes.

For example, in order to more optimally support a highly dynamic situation, e.g., in an automotive scenario, a continuous wave (CW) may instead be used as the radio transmit signal. However, a continuous wave, e.g., with constant frequency, may support velocity determination, but may not allow range determination, e.g., due to the lack of a time mark that could allow distance calculation.

In some demonstrative aspects, radio transmit signal 105 (FIG. 1) may be transmitted according to technologies such as, for example, Frequency-Modulated continuous wave (FMCW) radar, Phase-Modulated Continuous Wave (PMCW) radar, Orthogonal Frequency Division Multiplexing (OFDM) radar, and/or any other type of radar technology, which may support determination of range, velocity, and/or direction, e.g., as described below.

Figure 4:
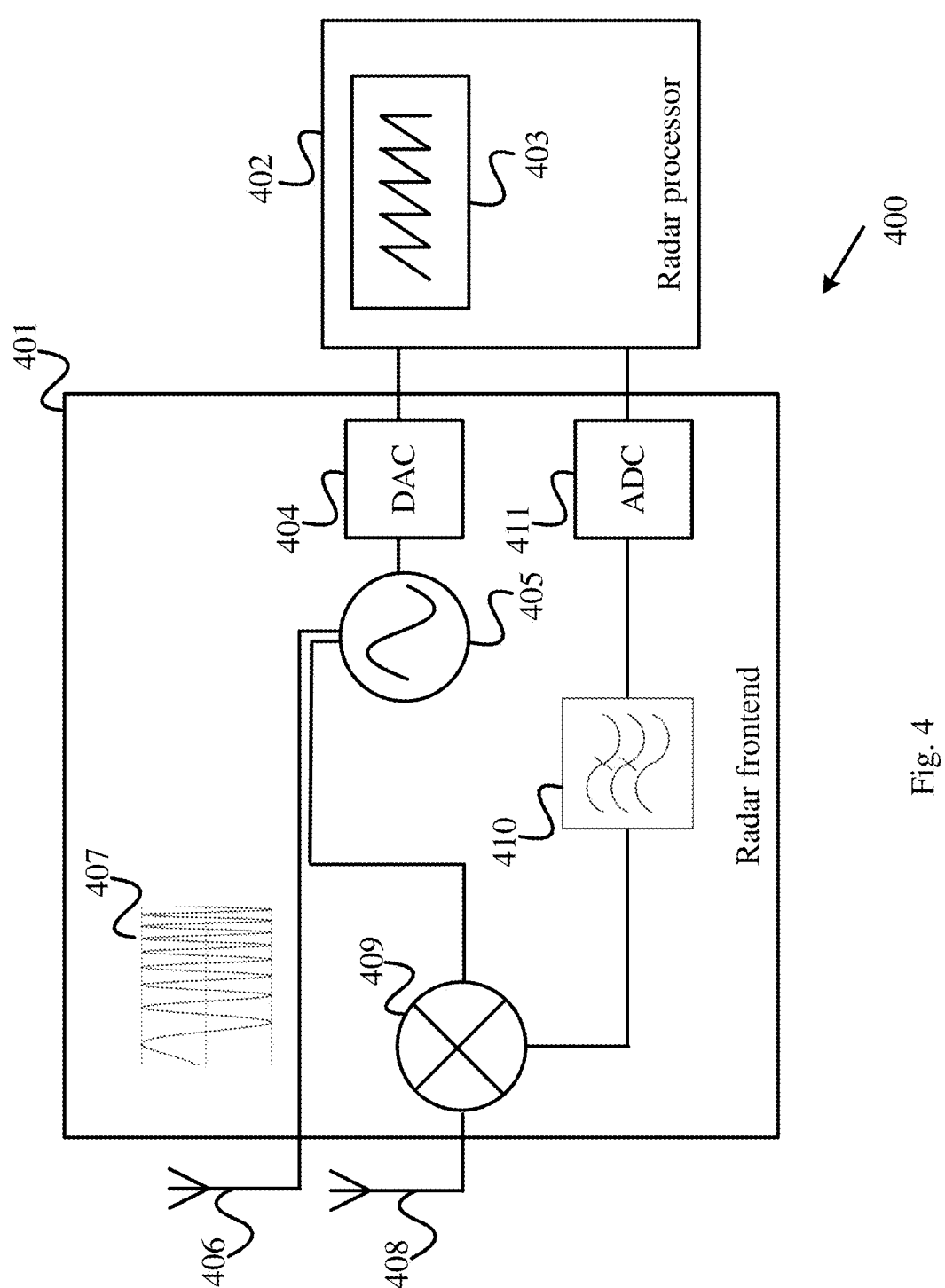
FIG. 4 is a schematic block diagram illustration of a Frequency-Modulated Continuous Wave (FMCW) radar apparatus, in accordance with some demonstrative aspects.

Reference is made to FIG. 4, which schematically illustrates a FMCW radar apparatus, in accordance with some demonstrative aspects.

In some demonstrative aspects, FMCW radar device 400 may include a radar frontend 401, and a radar processor 402. For example, radar frontend 304 (FIG. 3) may include one or more elements of, and/or may perform one or more operations and/or functionalities of, radar frontend 401; and/or radar processor 309 (FIG. 3) may include one or more elements of, and/or may perform one or more operations and/or functionalities of, radar processor 402.

In some demonstrative aspects, FMCW radar device 400 may be configured to communicate radio signals according to an FMCW radar technology, e.g., rather than sending a radio transmit signal with a constant frequency.

In some demonstrative aspects, radio frontend 401 may be configured to ramp up and reset the frequency of the transmit signal, e.g., periodically, for example, according to a saw tooth waveform 403. In other aspects, a triangle waveform, or any other suitable waveform may be used.

In some demonstrative aspects, for example, radar processor 402 may be configured to provide waveform 403 to frontend 401, for example, in digital form, e.g., as a sequence of digital values.

In some demonstrative aspects, radar frontend 401 may include a DAC 404 to convert waveform 403 into analog form, and to supply it to a voltage-controlled oscillator 405. For example, oscillator 405 may be configured to generate an output signal, which may be frequency-modulated in accordance with the waveform 403.

In some demonstrative aspects, oscillator 405 may be configured to generate the output signal including a radio transmit signal, which may be fed to and sent out by one or more transmit antennas 406.

In some demonstrative aspects, the radio transmit signal generated by the oscillator 405 may have the form of a sequence of chirps 407, which may be the result of the modulation of a sinusoid with the saw tooth waveform 403. In one example, a chirp 407 may correspond to the sinusoid of the oscillator signal frequency-modulated by a "tooth" of the saw tooth waveform 403, e.g., from the minimum frequency to the maximum frequency.

In some demonstrative aspects, FMCW radar device 400 may include one or more receive antennas 408 to receive a radio receive signal. The radio receive signal may be based on the echo of the radio transmit signal, e.g., in addition to any noise, interference, or the like.

In some demonstrative aspects, radar frontend 401 may include a mixer 409 to mix the radio transmit signal with the radio receive signal into a mixed signal.

In some demonstrative aspects, radar frontend 401 may include a filter, e.g., a Low Pass Filter (LPF) 410, which may be configured to filter the mixed signal from the mixer 409 to provide a filtered signal. For example, radar frontend 401 may include an ADC 411 to convert the filtered signal into digital reception data values, which may be provided to radar processor 402. In another example, the filter 410 may be a digital filter, and the ADC 411 may be arranged between the mixer 409 and the filter 410.

In some demonstrative aspects, radar processor 402 may be configured to process the digital reception data values to provide radar information, for example, including range, speed (velocity/Doppler), and/or direction (AoA) information of one or more objects.

In some demonstrative aspects, radar processor 402 may be configured to perform a first Fast Fourier Transform (FFT) (also referred to as "range FFT") to extract a delay response, which may be used to extract range information, and/or a second FFT (also referred to as "Doppler FFT") to extract a Doppler shift response, which may be used to extract velocity information, from the digital reception data values.

In other aspects, any other additional or alternative methods may be utilized to extract range information. In one example, in a digital radar implementation, a correlation with the transmitted signal may be used, e.g., according to a matched filter implementation.

Figure 5:
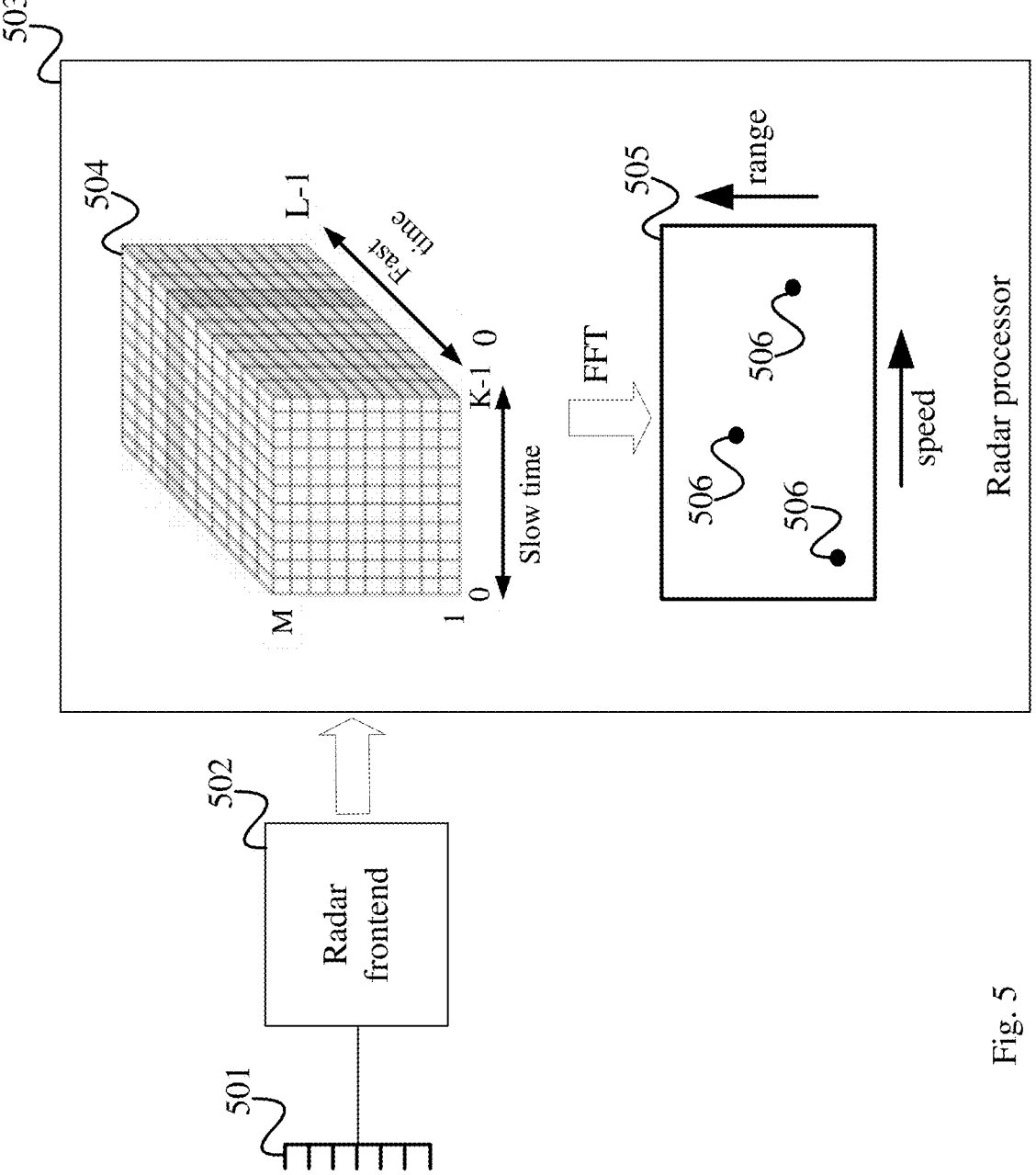
FIG. 5 is a schematic illustration of an extraction scheme, which may be implemented to extract range and speed (Doppler) estimations from digital reception radar data values, in accordance with some demonstrative aspects.

Reference is made to FIG. 5, which schematically illustrates an extraction scheme, which may be implemented to extract range and speed (Doppler) estimations from digital reception radar data values, in accordance with some demonstrative aspects. For example, radar processor 104

(FIG. 1), radar processor 210 (FIG. 2), radar processor 309 (FIG. 3), and/or radar processor 402 (FIG. 4), may be configured to extract range and/or speed (Doppler) estimations from digital reception radar data values according to one or more aspects of the extraction scheme of FIG. 5.

In some demonstrative aspects, as shown in FIG. 5, a radio receive signal, e.g., including echoes of a radio transmit signal, may be received by a receive antenna array 501. The radio receive signal may be processed by a radio radar frontend 502 to generate digital reception data values, e.g., as described above. The radio radar frontend 502 may provide the digital reception data values to a radar processor 503, which may process the digital reception data values to provide radar information, e.g., as described above.

In some demonstrative aspects, the digital reception data values may be represented in the form of a data cube 504. For example, the data cube 504 may include digitized samples of the radio receive signal, which is based on a radio signal transmitted from a transmit antenna and received by M receive antennas. In some demonstrative aspects, for example, with respect to a MIMO implementation, there may be multiple transmit antennas, and the number of samples may be multiplied accordingly.

In some demonstrative aspects, a layer of the data cube 504, for example, a horizontal layer of the data cube 504, may include samples of an antenna, e.g., a respective antenna of the M antennas.

In some demonstrative aspects, data cube 504 may include samples for K chirps. For example, as shown in FIG. 5, the samples of the chirps may be arranged in a so-called "slow time"-direction.

In some demonstrative aspects, the data cube 504 may include L samples, e.g., L=512 or any other number of samples, for a chirp, e.g., per each chirp. For example, as shown in FIG. 5, the samples per chirp may be arranged in a so-called "fast time"-direction of the data cube 504.

In some demonstrative aspects, radar processor 503 may be configured to process a plurality of samples, e.g., L samples collected for each chirp and for each antenna, by a first FFT. The first FFT may be performed, for example, for each chirp and each antenna, such that a result of the processing of the data cube 504 by the first FFT may again have three dimensions, and may have the size of the data cube 504 while including values for L range bins, e.g., instead of the values for the L sampling times.

In some demonstrative aspects, radar processor 503 may be configured to process the result of the processing of the data cube 504 by the first FFT, for example, by processing the result according to a second FFT along the chirps, e.g., for each antenna and for each range bin.

For example, the first FFT may be in the "fast time" direction, and the second FFT may be in the "slow time" direction.

In some demonstrative aspects, the result of the second FFT may provide, e.g., when aggregated over the antennas, a range/Doppler (R/D) map 505. The R/D map may have FFT peaks 506, for example, including peaks of FFT output values (in terms of absolute values) for certain range/speed combinations, e.g., for range/Doppler bins. For example, a range/Doppler bin may correspond to a range bin and a Doppler bin. For example, radar processor 503 may consider a peak as potentially corresponding to an object, e.g., of the range and speed corresponding to the peak's range bin and speed bin.

In some demonstrative aspects, the extraction scheme of FIG. 5 may be implemented for an FMCW radar, e.g., FMCW radar 400 (FIG. 4), as described above. In other aspects, the extraction scheme of FIG. 5 may be implemented for any other radar type. In one example, the radar processor 503 may be configured to determine a range/Doppler map 505 from digital reception data values of a PMCW radar, an OFDM radar, or any other radar technologies. For example, in adaptive or cognitive radar, the pulses in a frame, the waveform and/or modulation may be changed over time, e.g., according to the environment.

Referring back to FIG. 3, in some demonstrative aspects, receive antenna arrangement 303 may be implemented using a receive antenna array having a plurality of receive antennas (or receive antenna elements). For example, radar processor 309 may be configured to determine an angle of arrival of the received radio signal, e.g., echo 107 (FIG. 1) and/or echo 215 (FIG. 2). For example, radar processor 309 may be configured to determine a direction of a detected object, e.g., with respect to the device/system 301, for example, based on the angle of arrival of the received radio signal, e.g., as described below.

Figure 6:
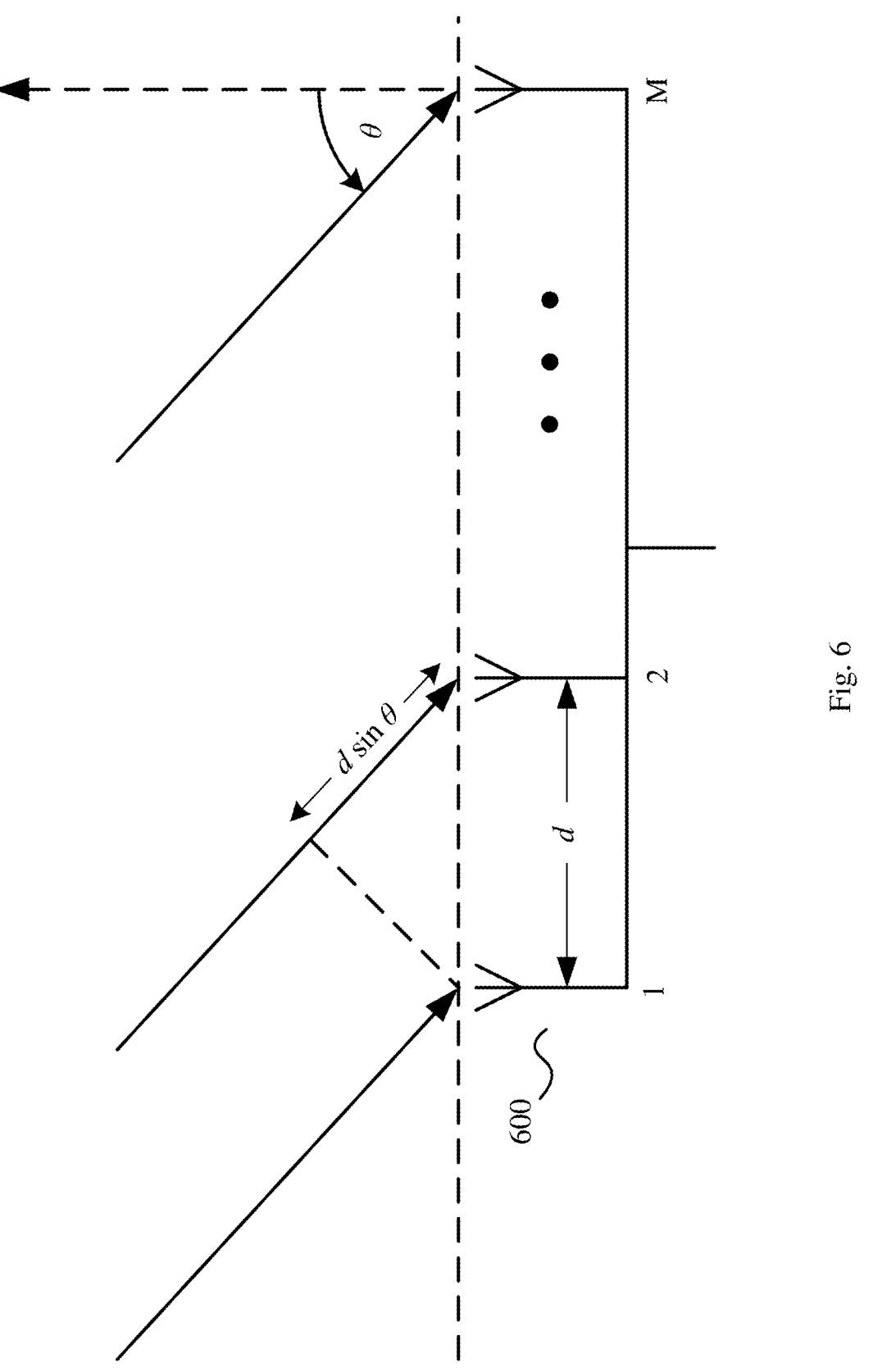
FIG. 6 is a schematic illustration of an angle-determination scheme, which may be implemented to determine Angle of Arrival (AoA) information based on an incoming radio signal received by a receive antenna array, in accordance with some demonstrative aspects.

Reference is made to FIG. 6, which schematically illustrates an angle-determination scheme, which may be implemented to determine Angle of Arrival (AoA) information based on an incoming radio signal received by a receive antenna array 600, in accordance with some demonstrative aspects.

FIG. 6 depicts an angle-determination scheme based on received signals at the receive antenna array.

In some demonstrative aspects, for example, in a virtual MIMO array, the angle-determination may also be based on the signals transmitted by the array of Tx antennas.

FIG. 6 depicts a one-dimensional angle-determination scheme. Other multi-dimensional angle determination schemes, e.g., a two-dimensional scheme or a three-dimensional scheme, may be implemented.

In some demonstrative aspects, as shown in FIG. 6, the receive antenna array 600 may include M antennas (numbered, from left to right, 1 to M).

As shown by the arrows in FIG. 6, it is assumed that an echo is coming from an object located at the top left direction. Accordingly, the direction of the echo, e.g., the incoming radio signal, may be towards the bottom right. According to this example, the further to the left a receive antenna is located, the earlier it will receive a certain phase of the incoming radio signal.

For example, a phase difference, denoted $\Delta\varphi$, between two antennas of the receive antenna array 600 may be determined, e.g., as follows:

$$\Delta\varphi = \frac{2\pi}{\lambda} \cdot d \cdot \sin(\theta)$$

wherein $\lambda$ denotes a wavelength of the incoming radio signal, d denotes a distance between the two antennas, and $\theta$ denotes an angle of arrival of the incoming radio signal, e.g., with respect to a normal direction of the array.

In some demonstrative aspects, radar processor 309 (FIG. 3) may be configured to utilize this relationship between phase and angle of the incoming radio signal, for example, to determine the angle of arrival of echoes, for example by performing an FFT, e.g., a third FFT ("angular FFT") over the antennas.

In some demonstrative aspects, multiple transmit antennas, e.g., in the form of an antenna array having multiple transmit antennas, may be used, for example, to increase the spatial resolution, e.g., to provide high-resolution radar information. For example, a MIMO radar device may utilize a virtual MIMO radar antenna, which may be formed as a convolution of a plurality of transmit antennas convolved with a plurality of receive antennas.

Figure 7:
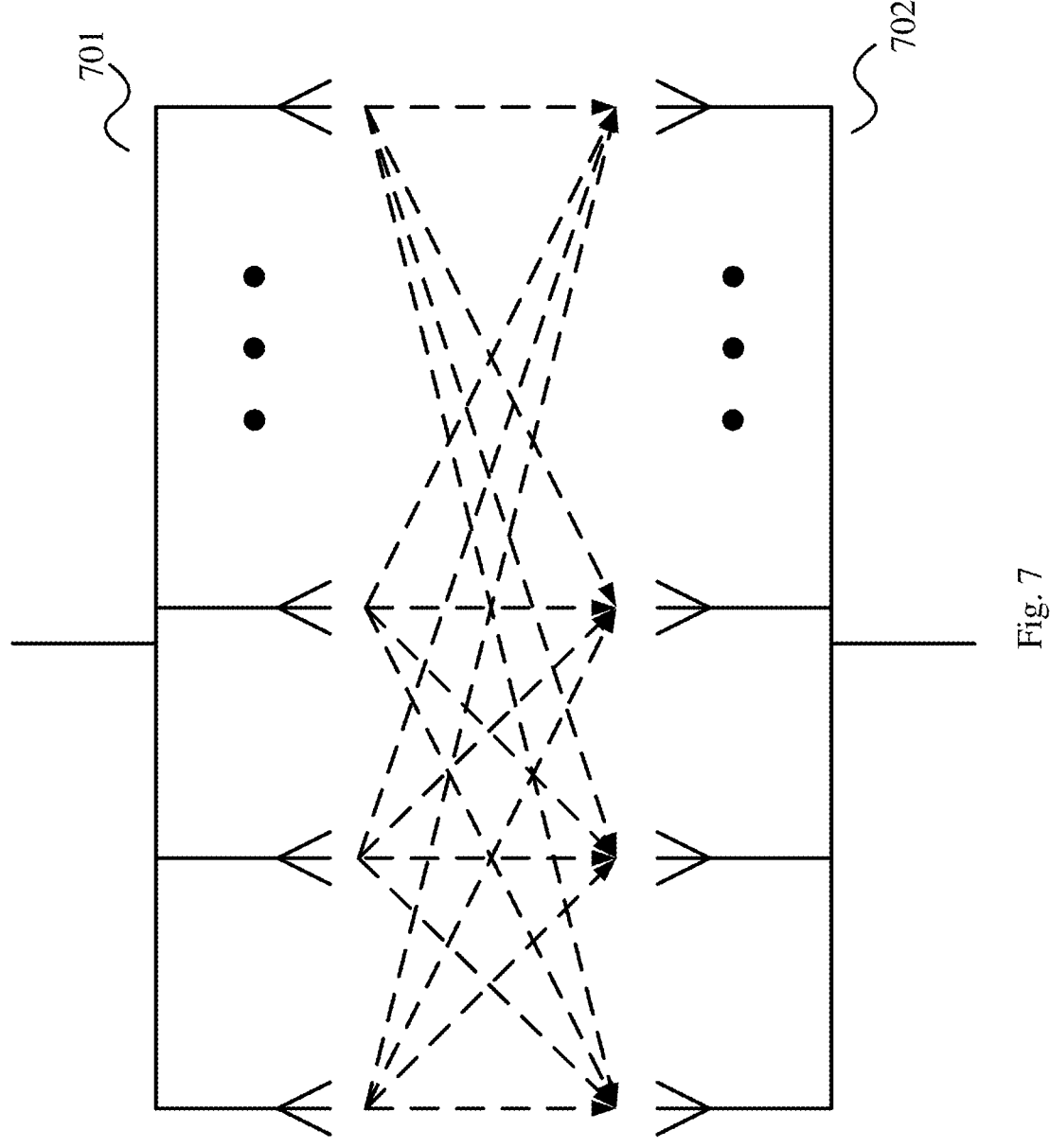
FIG. 7 is a schematic illustration of a Multiple-Input-Multiple-Output (MIMO) radar antenna scheme, which may be implemented based on a combination of Transmit (Tx) and Receive (Rx) antennas, in accordance with some demonstrative aspects.

Reference is made to FIG. 7, which schematically illustrates a MIMO radar antenna scheme, which may be implemented based on a combination of Transmit (Tx) and Receive (Rx) antennas, in accordance with some demonstrative aspects.

In some demonstrative aspects, as shown in FIG. 7, a radar MIMO arrangement may include a transmit antenna array 701 and a receive antenna array 702. For example, the one or more transmit antennas 302 (FIG. 3) may be implemented to include transmit antenna array 701, and/or the one or more receive antennas 303 (FIG. 3) may be implemented to include receive antenna array 702.

In some demonstrative aspects, antenna arrays including multiple antennas both for transmitting the radio transmit signals and for receiving echoes of the radio transmit signals, may be utilized to provide a plurality of virtual channels as illustrated by the dashed lines in FIG. 7. For example, a virtual channel may be formed as a convolution, for example, as a Kronecker product, between a transmit antenna and a receive antenna, e.g., representing a virtual steering vector of the MIMO radar.

In some demonstrative aspects, a transmit antenna, e.g., each transmit antenna, may be configured to send out an individual radio transmit signal, e.g., having a phase associated with the respective transmit antenna.

For example, an array of N transmit antennas and M receive antennas may be implemented to provide a virtual MIMO array of size N×M. For example, the virtual MIMO array may be formed according to the Kronecker product operation applied to the Tx and Rx steering vectors.

Figure 8:
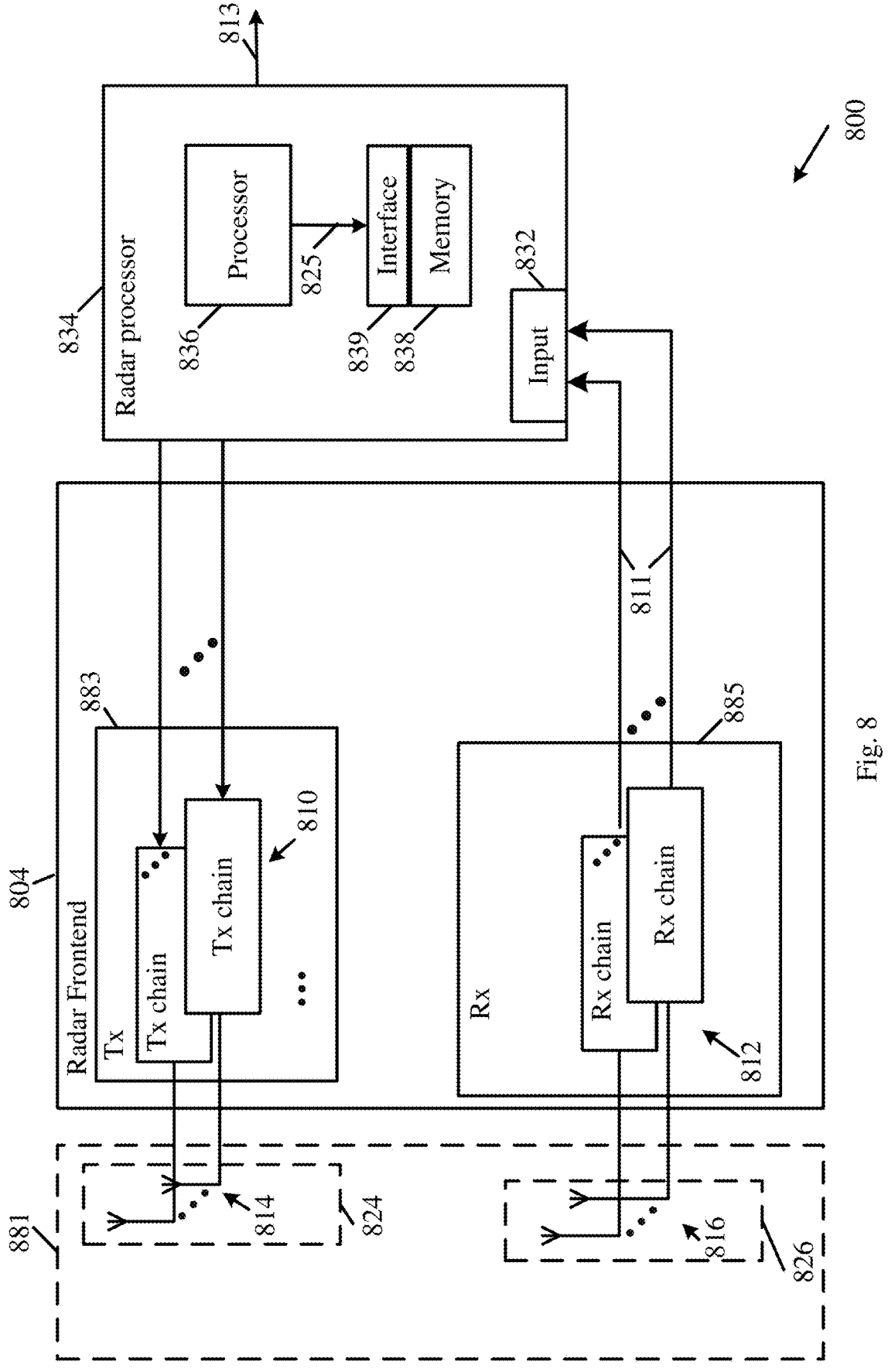
FIG. 8 is a schematic block diagram illustration of elements of a radar device including a radar frontend and a radar processor, in accordance with some demonstrative aspects.

FIG. 8 is a schematic block diagram illustration of elements of a radar device 800, in accordance with some demonstrative aspects. For example, radar device 101 (FIG. 1), radar device 300 (FIG. 3), and/or radar device 400 (FIG. 4), may include one or more elements of radar device 800, and/or may perform one or more operations and/or functionalities of radar device 800.

In some demonstrative aspects, as shown in FIG. 8, radar device 800 may include a radar frontend 804 and a radar processor 834. For example, radar frontend 103 (FIG. 1), radar frontend 211 (FIG. 1), radar frontend 304 (FIG. 3), radar frontend 401 (FIG. 4), and/or radar frontend 502 (FIG. 5), may include one or more elements of radar frontend 804, and/or may perform one or more operations and/or functionalities of radar frontend 804.

In some demonstrative aspects, radar frontend 804 may be implemented as part of a MIMO radar utilizing a MIMO radar antenna 881 including a plurality of Tx antennas 814 configured to transmit a plurality of Tx RF signals (also referred to as "Tx radar signals"); and a plurality of Rx antennas 816 configured to receive a plurality of Rx RF signals (also referred to as "Rx radar signals"), for example, based on the Tx radar signals, e.g., as described below.

In some demonstrative aspects, MIMO antenna array 881, antennas 814, and/or antennas 816 may include or may be part of any type of antennas suitable for transmitting and/or receiving radar signals. For example, MIMO antenna array 881, antennas 814, and/or antennas 816, may be implemented as part of any suitable configuration, structure, and/or arrangement of one or more antenna elements, components, units, assemblies, and/or arrays. For example, MIMO antenna array 881, antennas 814, and/or antennas 816, may be implemented as part of a phased array antenna, a multiple element antenna, a set of switched beam antennas, and/or the like. In some aspects, MIMO antenna array 881, antennas 814, and/or antennas 816, may be implemented to support transmit and receive functionalities using separate transmit and receive antenna elements. In some aspects, MIMO antenna array 881, antennas 814, and/or antennas 816, may be implemented to support transmit and receive functionalities using common and/or integrated transmit/receive elements.

In some demonstrative aspects, MIMO radar antenna 881 may include a rectangular MIMO antenna array, and/or curved array, e.g., shaped to fit a vehicle design.

In other aspects, any other form, shape, and/or arrangement of MIMO radar antenna 881 may be implemented.

In some demonstrative aspects, radar frontend 804 may include one or more radios configured to generate and transmit the Tx RF signals via Tx antennas 814; and/or to process the Rx RF signals received via Rx antennas 816, e.g., as described below.

In some demonstrative aspects, radar frontend 804 may include at least one transmitter (Tx) 883 including circuitry and/or logic configured to generate and/or transmit the Tx radar signals via Tx antennas 814.

In some demonstrative aspects, radar frontend 804 may include at least one receiver (Rx) 885 including circuitry and/or logic to receive and/or process the Rx radar signals received via Rx antennas 816, for example, based on the Tx radar signals.

In some demonstrative aspects, transmitter 883, and/or receiver 885 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like.

In some demonstrative aspects, transmitter 883 may include a plurality of Tx chains 810 configured to generate and transmit the Tx RF signals via Tx antennas 814, e.g., respectively; and/or receiver 885 may include a plurality of Rx chains 812 configured to receive and process the Rx RF signals received via the Rx antennas 816, e.g., respectively.

In some demonstrative aspects, radar processor 834 may be configured to generate radar information 813, for example, based on the radar signals communicated by MIMO radar antenna 881, e.g., as described below. For example, radar processor 104 (FIG. 1), radar processor 210 (FIG. 2), radar processor 309 (FIG. 3), radar processor 402 (FIG. 4), and/or radar processor 503 (FIG. 5), may include one or more elements of radar processor 834, and/or may perform one or more operations and/or functionalities of radar processor 834.

In some demonstrative aspects, radar processor 834 may be configured to generate radar information 813, for example, based on radar Rx data 811 received from the plurality of Rx chains 812. For example, radar Rx data 811 may be based on the radar Rx signals received via the Rx antennas 816.

In some demonstrative aspects, radar processor 834 may include an input 832 to receive radar input data, e.g., including the radar Rx data 811 from the plurality of Rx chains 812.

In some demonstrative aspects, radar processor 834 may include, or may be implemented, partially or entirely, by circuitry and/or logic, e.g., one or more processors including circuitry and/or logic, memory circuitry and/or logic. Additionally or alternatively, one or more functionalities of radar processor 834 may be implemented by logic, which may be executed by a machine and/or one or more processors, e.g., as described below.

In some demonstrative aspects, radar processor 834 may include at least one processor 836, which may be configured, for example, to process the radar Rx data 811, and/or to perform one or more operations, methods, and/or algorithms.

In some demonstrative aspects, radar processor 834 may include at least one memory 838, e.g., coupled to the processor 836. For example, memory 838 may be configured to store data processed by radar processor 834. For example, memory 838 may store, e.g., at least temporarily, at least some of the information processed by the processor 836, and/or logic to be utilized by the processor 836.

In some demonstrative aspects, processor 836 may interface with memory 838, for example, via a memory interface 839.

In some demonstrative aspects, processor 836 may be configured to access memory 838, e.g., to write data to memory 838 and/or to read data from memory 838, for example, via memory interface 839.

In some demonstrative aspects, memory 838 may be configured to store at least part of the radar data, e.g., some of the radar Rx data or all of the radar Rx data, for example, for processing by processor 836, e.g., as described below.

In some demonstrative aspects, memory 838 may be configured to store processed data, which may be generated by processor 836, for example, during the process of generating the radar information 813, e.g., as described below.

In some demonstrative aspects, memory 838 may be configured to store range information and/or Doppler information, which may be generated by processor 836, for example, based on the radar Rx data. In one example, the range information and/or Doppler information may be determined based on a Cross-Correlation (XCORR) operation (also referred to as "range processing") and/or Doppler processing, which may be applied to the radar Rx data. Any other additional or alternative operation, algorithm, and/or procedure may be utilized to generate the range information and/or Doppler information.

In some demonstrative aspects, memory 838 may be configured to store AoA information, which may be generated by processor 836, for example, based on the radar Rx data, the range information and/or Doppler information. In one example, the AoA information may be determined based on an AoA estimation algorithm. Any other additional or alternative operation, algorithm, and/or procedure may be utilized to generate the AoA information.

In some demonstrative aspects, radar processor 834 may be configured to generate the radar information 813 including one or more of range information, Doppler information, and/or AoA information.

In some demonstrative aspects, the radar information 813 may include Point Cloud 1 (PC1) information, for example, including raw point cloud estimations, e.g., Range, Radial Velocity, Azimuth, and/or Elevation.

In some demonstrative aspects, the radar information 813 may include Point Cloud 2 (PC2) information, which may be generated, for example, based on the PC1 information. For example, the PC2 information may include clustering information, tracking information, e.g., tracking of probabilities and/or density functions, bounding box information, classification information, orientation information, and the like.

In some demonstrative aspects, the radar information 813 may include target tracking information corresponding to a plurality of targets in an environment of the radar device 800, e.g., as described below.

In some demonstrative aspects, radar processor 834 may be configured to generate the radar information 813 in the form of four Dimensional (4D) image information, e.g., a cube, which may represent 4D information corresponding to one or more detected targets.

In some demonstrative aspects, the 4D image information may include, for example, range values, e.g., based on the range information, velocity values, e.g., based on the Doppler information, azimuth values, e.g., based on azimuth AoA information, elevation values, e.g., based on elevation AoA information, and/or any other values.

In some demonstrative aspects, radar processor 834 may be configured to generate the radar information 813 in any other form, and/or including any other additional or alternative information.

In some demonstrative aspects, radar processor 834 may be configured to process the signals communicated via MIMO radar antenna 881 as signals of a virtual MIMO array formed by a convolution of the plurality of Rx antennas 816 and the plurality of Tx antennas 814.

In some demonstrative aspects, radar frontend 804 and/or radar processor 834 may be configured to utilize MIMO techniques, for example, to support a reduced physical array aperture, e.g., an array size, and/or utilizing a reduced number of antenna elements. For example, radar frontend 804 and/or radar processor 834 may be configured to transmit orthogonal signals via one or more Tx arrays 824 including a plurality of N elements, e.g., Tx antennas 814, and processing received signals via one or more Rx arrays 826 including a plurality of M elements, e.g., Rx antennas 816.

In some demonstrative aspects, utilizing the MIMO technique of transmission of the orthogonal signals from the Tx arrays 824 with N elements and processing the received signals in the Rx arrays 826 with M elements may be equivalent, e.g., under a far field approximation, to a radar utilizing transmission from one antenna and reception with N*M antennas. For example, radar frontend 804 and/or radar processor 834 may be configured to utilize MIMO antenna array 881 as a virtual array having an equivalent array size of N*M, which may define locations of virtual elements, for example, as a convolution of locations of physical elements, e.g., the antennas 814 and/or 816.

In some demonstrative aspects, a radar system may include a plurality of radar devices 800. For example, vehicle 100 (FIG. 1) may include a plurality of radar devices 800, e.g., as described below.

Figure 9:
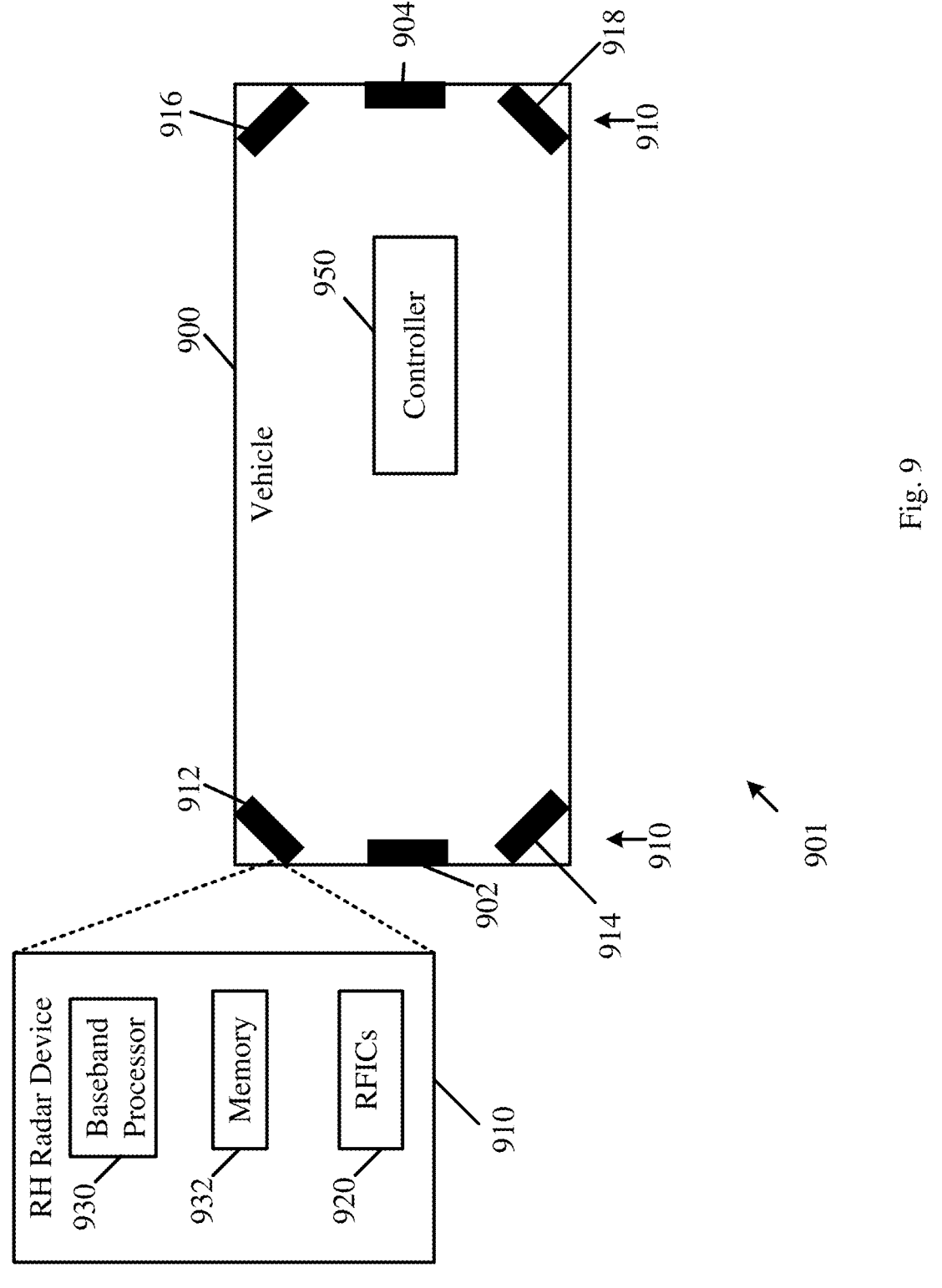
FIG. 9 is a schematic illustration of a radar system including a plurality of radar devices implemented in a vehicle, in accordance with some demonstrative aspects.

Reference is made to FIG. 9, which schematically illustrates a radar system 901 including a plurality of Radio Head (RH) radar devices (also referred to as RHs) 910 implemented in a vehicle 900, in accordance with some demonstrative aspects.

In some demonstrative aspects, as shown in FIG. 9, the plurality of RH radar devices 910 may be located, for example, at a plurality of positions around vehicle 900, for example, to provide radar sensing at a large field of view around vehicle 900, e.g., as described below.

In some demonstrative aspects, as shown in FIG. 9, the plurality of RH radar devices 910 may include, for example, six RH radar devices 910, e.g., as described below.

In some demonstrative aspects, the plurality of RH radar devices 910 may be located, for example, at a plurality of positions around vehicle 900, which may be configured to support 360-degrees radar sensing, e.g., a field of view of 360 degrees surrounding the vehicle 900, e.g., as described below.

In one example, the 360-degrees radar sensing may allow to provide a radar-based view of substantially all surroundings around vehicle 900, e.g., as described below.

In other aspects, the plurality of RH radar devices 910 may include any other number of RH radar devices 910, e.g., less than six radar devices or more than six radar devices.

In other aspects, the plurality of RH radar devices 910 may be positioned at any other locations and/or according to any other arrangement, which may support radar sensing at any other field of view around vehicle 900, e.g., 360-degrees radar sensing or radar sensing of any other field of view.

In some demonstrative aspects, as shown in FIG. 9, vehicle 900 may include a first RH radar device 902, e.g., a front RH, at a front-side of vehicle 900.

In some demonstrative aspects, as shown in FIG. 9, vehicle 900 may include a second RH radar device 904, e.g., a back RH, at a back-side of vehicle 900.

In some demonstrative aspects, as shown in FIG. 9, vehicle 900 may include one or more of RH radar devices at one or more respective corners of vehicle 900. For example, vehicle 900 may include a first corner RH radar device 912 at a first corner of vehicle 900, a second corner RH radar device 914 at a second corner of vehicle 900, a third corner RH radar device 916 at a third corner of vehicle 900, and/or a fourth corner RH radar device 918 at a fourth corner of vehicle 900.

In some demonstrative aspects, vehicle 900 may include one, some, or all, of the plurality of RH radar devices 910 shown in FIG. 9. For example, vehicle 900 may include the front RH radar device 902 and/or back RH radar device 904.

In other aspects, vehicle 900 may include any other additional or alternative radar devices, for example, at any other additional or alternative positions around vehicle 900. In one example, vehicle 900 may include a side radar, e.g., on a side of vehicle 900.

In some demonstrative aspects, as shown in FIG. 9, vehicle 900 may include a radar system controller 950 configured to control one or more, e.g., some or all, of the RH radar devices 910.

In some demonstrative aspects, at least part of the functionality of radar system controller 950 may be implemented by a dedicated controller, e.g., a dedicated system controller or central controller, which may be separate from the RH radar devices 910, and may be configured to control some or all of the RH radar devices 910.

In some demonstrative aspects, at least part of the functionality of radar system controller 950 may be implemented as part of at least one RH radar device 910.

In some demonstrative aspects, at least part of the functionality of radar system controller 950 may be implemented by a radar processor of an RH radar device 910. For example, radar processor 834 (FIG. 8) may include one or more elements of radar system controller 950, and/or may perform one or more operations and/or functionalities of radar system controller 950.

In some demonstrative aspects, at least part of the functionality of radar system controller 950 may be implemented by a system controller of vehicle 900. For example, vehicle controller 108 (FIG. 1) may include one or more elements of radar system controller 950, and/or may perform one or more operations and/or functionalities of radar system controller 950.

In other aspects, one or more functionalities of system controller 950 may be implemented as part of any other element of vehicle 900.

In some demonstrative aspects, as shown in FIG. 9, an RH radar device 910 of the plurality of RH radar devices 910, may include a baseband processor 930 (also referred to as a "Baseband Processing Unit (BPU)"), which may be configured to control communication of radar signals by the RH radar device 910, and/or to process radar signals communicated by the RH radar device 910. For example, baseband processor 930 may include one or more elements of radar processor 834 (FIG. 8), and/or may perform one or more operations and/or functionalities of radar processor 834 (FIG. 8).

In other aspects, an RH radar device 910 of the plurality of RH radar devices 910 may exclude one or more, e.g., some or all, functionalities of baseband processor 930. For example, controller 950 may be configured to perform one or more, e.g., some or all, functionalities of the baseband processor 930 for the RH.

In one example, controller 950 may be configured to perform baseband processing for all RH radar devices 910, and all RH radio devices 910 may be implemented without baseband processors 930.

In another example, controller 950 may be configured to perform baseband processing for one or more first RH radar devices 910, and the one or more first RH radio devices 910 may be implemented without baseband processors 930; and/or one or more second RH radar devices 910 may be implemented with one or more functionalities, e.g., some or all functionalities, of baseband processors 930.

In another example, one or more, e.g., some or all, RH radar devices 910 may be implemented with one or more functionalities, e.g., partial functionalities or full functionalities, of baseband processors 930.

In some demonstrative aspects, baseband processor 930 may include one or more components and/or elements configured for digital processing of radar signals communicated by the RH radar device 910, e.g., as described below.

In some demonstrative aspects, baseband processor 930 may include one or more FFT engines, matrix multiplication engines, DSP processors, and/or any other additional or alternative baseband, e.g., digital, processing components.

In some demonstrative aspects, as shown in FIG. 9, RH radar device 910 may include a memory 932, which may be configured to store data processed by, and/or to be processed by, baseband processor 930. For example, memory 932 may include one or more elements of memory 838 (FIG. 8), and/or may perform one or more operations and/or functionalities of memory 838 (FIG. 8).

In some demonstrative aspects, memory 932 may include an internal memory, and/or an interface to one or more external memories, e.g., an external Double Data Rate (DDR) memory, and/or any other type of memory.

In other aspects, an RH radar device 910 of the plurality of RH radar devices 910 may exclude memory 932. For example, the RH radar device 910 may be configured to provide radar data to controller 950, e.g., in the form of raw radar data.

In some demonstrative aspects, as shown in FIG. 9, RH radar device 910 may include one or more RF units, e.g., in the form of one or more RF Integrated Chips (RFICs) 920, which may be configured to communicate radar signals, e.g., as described below.

For example, an RFIC 920 may include one or more elements of front-end 804 (FIG. 8), and/or may perform one or more operations and/or functionalities of frontend 804 (FIG. 8).

In some demonstrative aspects, the plurality of RFICs 920 may be operable to form a radar antenna array including one or more Tx antenna arrays and one or more Rx antenna arrays.

For example, the plurality of RFICs 920 may be operable to form MIMO radar antenna 881 (FIG. 8) including Tx arrays 824 (FIG. 8), and/or Rx arrays 826 (FIG. 8).

In some demonstrative aspects, the plurality of RH radar devices 910 may be installed, for example, as integrated units around vehicle 900, for example, in the front, the rear, and/or corners of vehicle 900. For example, the plurality of RH radar devices 910 may be installed at a low position, e.g., at a bumper level of a bumper of vehicle 900, and/or or at a high position, e.g., on top of the vehicle 900, for example, on a roof of the vehicle.

In one example, radar devices may be positioned at dedicated high positions on vehicle 900, for example, to allow long-range detection and/or a clear Field of View (FoV).

In some demonstrative aspects, for example, in some use cases, scenarios, and/or implementations, there may be a need to address one or more technical issues of techniques implementing radar systems using radar devices, e.g., possibly of different types, each performing an entire radar functionality, e.g., from antenna processing to point cloud information or a detection list, e.g., as described below.

In one example, using different types of radar devices that perform the entire radar functionality may result in a complicated radar system.

In some demonstrative aspects, for example, in some use cases, scenarios, and/or implementations, there may be a need to address one or more technical issues of techniques implementing radar systems using joint processing of multiple radar devices, e.g., as described below.

For example, higher layer processing or joint processing of the radar devices may be performed on a single radar device or as a fusion of point cloud information or detection lists from the radar devices.

For example, joint processing may be performed based on point cloud fusion of point cloud information from multiple radar devices. The joint processing may be based on raw point cloud information from the plurality of radar devices as an input to a fusion function.

In one example, the joint processing may be limited and/or bound by a tradeoff between hard performance versus implementation efficiency, e.g., power consumption, form factors, weight, cost, or the like. For example, the larger the aperture, the better the performance. However, the better performance may be at a cost of a high complexity and/or a bulky implementation.

In some demonstrative aspects, there may be a need to address one or more technical issues of a Multi Static (MS) radar configuration, which may be implemented, for example, to enable improved radar resolution. For example, radar transmit and receive antennas of a MS radar configuration may be located at different places and/or at different RHs. For example, coherent MS radar configuration may provide improved resolution compared to a non-coherent MS radar configuration.

In some demonstrative aspects, there may be a need to provide a technical solution for joint processing of radar devices, In some demonstrative aspects, radar system 901 may be configured to provide a technical solution to implement a radar system according to a distributed radar system architecture, which may support high performance, for example, with a light weight, low power, a compact form-factor and/or a low cost radar system, e.g., as described below.

In some demonstrative aspects, the distributed radar system architecture may be configured to provide a technical solution according, for example, to a view point of an entire vehicle, for example, to provide a sensing suit for autonomous vehicles, which may have high performance and/or a low implementation penalty. For example, the distributed radar system architecture may be configured to provide a technical solution to "break" the tradeoff between performance and implementation of an integrated radar system.

Figure 10:
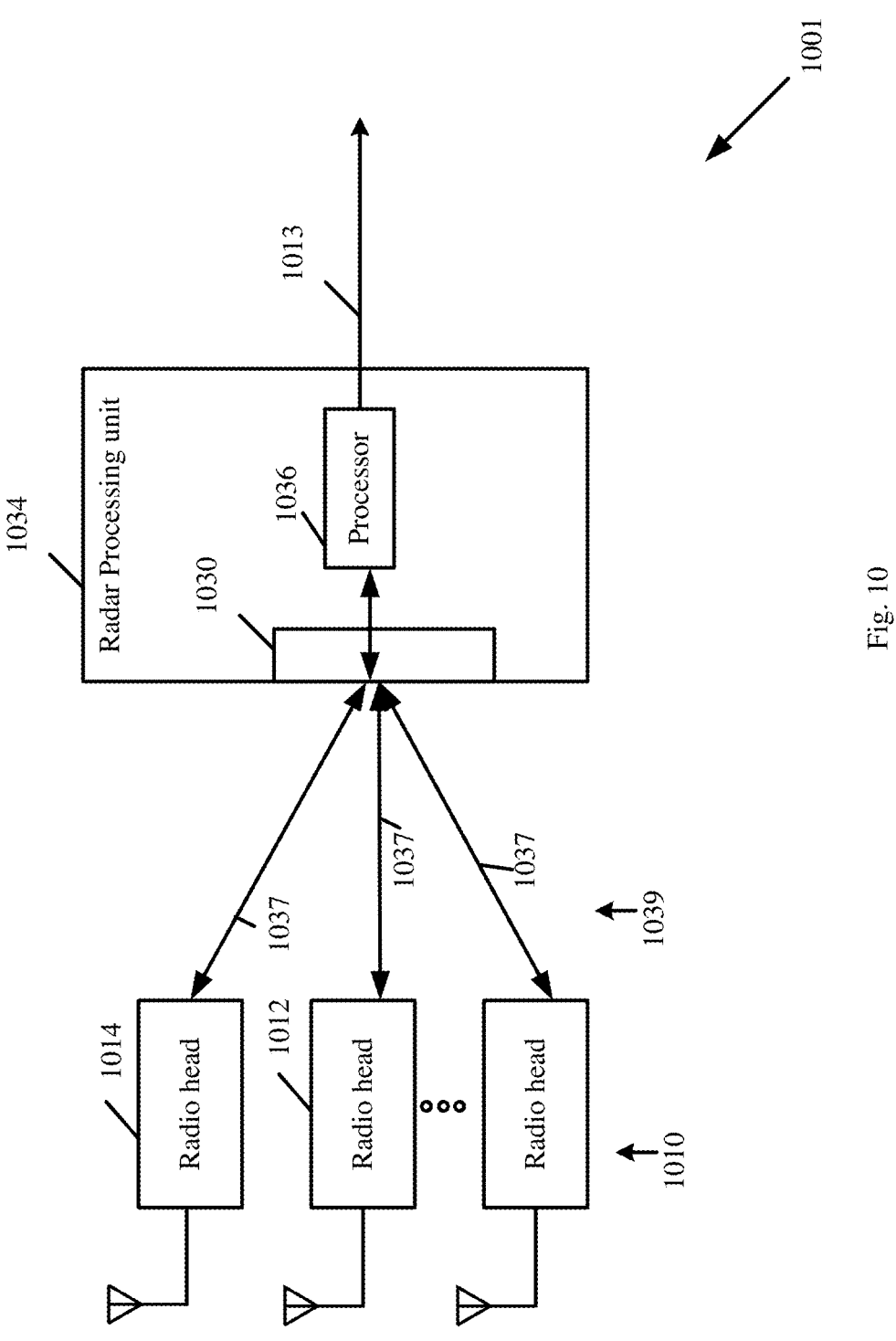
FIG. 10 is a schematic illustration of a radar system, in accordance with some demonstrative aspects.

Reference is made to FIG. 10, which schematically illustrates a radar system 1001, in accordance with some demonstrative aspects. For example, radar system 901 (FIG. 9) may include one or more elements of radar system 1001, and/or may perform one or more operations and/or functionalities of radar system 1001.

In some demonstrative aspects, as shown in FIG. 10, radar system 1001 may include a plurality of RHs 1010. For example, one or more, e.g., some or all, radio devices the plurality of RH radar devices 910 (FIG. 9) may include one or more elements of one or more RHs 1010, and/or may perform one or more operations and/or functionalities of one or more RHs 1010. For example, an RH radar device 910 (FIG. 9) may include one or more elements of an RH 1010, and/or may perform one or more operations and/or functionalities of an RH 1010.

In some demonstrative aspects, the plurality of RHs 1010 may include a first RH 1012, and/or a second RH 1014, e.g., as described below.

In some demonstrative aspects, as shown in FIG. 10, radar system 1001 may include a processor, e.g., a radar processing unit (also referred to as "main unit", "main processor, "central processor", "radar processor" or "radar controller") 1034, which may be configured, for example, to generate radar information 1013, for example, based on radar communications by the plurality of RHs 1010, e.g., as described below.

In some demonstrative aspects, as shown in FIG. 10, radar processing unit 1034 may include a communication interface 1030 configured to communicate with the plurality of RHs 1010, for example, via a communication interconnect 1039, e.g., as described below.

In some demonstrative aspects, radar processing unit 1034 may include a processor 1036 configured to control and/or coordinate radar communications by the plurality of RHs 1010, and to generate radar information 1013, for example, based on the radar communications by the plurality of RHs 1010, e.g., as described below.

In some demonstrative aspects, processor 1036 may include, or may be implemented, partially or entirely, by circuitry and/or logic, e.g., one or more processors including circuitry and/or logic, memory circuitry and/or logic. Additionally or alternatively, one or more functionalities of processor 1036 may be implemented by logic, which may be executed by a machine and/or one or more processors, e.g., as described below.

In some demonstrative aspects, processor 1036 may be configured to communicate radar information 1037 with the plurality of RHs 1010, for example, via the communication interconnect 1039, e.g., as described below.

In some demonstrative aspects, radar information 1037 may include, for example, radar Tx information and/or radar Rx information, which may be communicated with the plurality of RHs 1010, e.g., as described below.

In some demonstrative aspects, processor 1036 may be configured to communicate the radar Tx information and/or the radar Rx information with the plurality of RHs 1010, for example, via the communication interconnect 1039, e.g., as described below.

In some demonstrative aspects, the radar Tx information may be configured to configure radar Tx signals to be transmitted by one or more Tx chains of the plurality of RHs 1010.

In some demonstrative aspects, the radar Rx information may be based on radar Rx signals received by one or more Rx chains of the plurality of RHs 1010.

In some demonstrative aspects, the communication interface 1030 may include a dielectric waveguide communication interface, for example, to communicate the radar information 1037, e.g., the radar Tx information and/or the radar Rx information, with the plurality of RHs 1010 via a dielectric waveguide interconnect 1039, e.g., as described below.

In some demonstrative aspects, the communication interface 1030 may include an Active Optical Cable (AOC) communication interface, for example, to communicate the radar information 1037, e.g., the radar Tx information and/or the radar Rx information, with the plurality of RHs 1010 via an AOC interconnect 1039, e.g., as described below.

In some demonstrative aspects, the communication interface 1030 may include a fiber optic communication interface, for example, to communicate the radar information 1037, e.g., the radar Tx information and/or the radar Rx information, with the plurality of RHs 1010 via a fiber optic interconnect 1039, e.g., as described below.

In other aspects, the communication interface 1030 may include any other additional or alternative communication interface, for example, to communicate the radar information 1037, e.g., the radar Tx information and/or the radar Rx information, with the plurality of RHs 1010 via any other interconnect 1039.

In some demonstrative aspects, processor 1036 may be configured to process the radar Rx information received via the communication interface 1030, and to generate the radar information 1013, for example, based on the radar Rx information, e.g., as described below.

In some demonstrative aspects, processor 1036 may be configured to receive via communication interface 1030 or more digital Rx signals from an RH 1010, for example, RH 1012 and/or RH 1014, e.g., as described below.

In some demonstrative aspects, the one or more digital Rx signals from the RH 1012 may be based on signals received by one or more respective Rx chains of the RH 1012; and/or the one or more digital Rx signals from the RH 1014 may be based on signals received by one or more respective Rx chains of the RH 1014, e.g., as described below.

In some demonstrative aspects, the one or more digital Rx signals from an RH 1010, e.g., RH 1012 and/or RH 1014, may include compressed Rx information representing Rx radar samples corresponding to the signals received by the one or more Rx chains of the RH 1010, e.g., as described below. For example, RH 1010, e.g., RH 1012 and/or RH 1014, may be configured to generate the compressed Rx information according to a predefined compression scheme, for example, to reduce the amount of data communicated over the communication interconnect 1039.

In some demonstrative aspects, processor 1036 may be configured to decompress the compressed Rx information, for example, from the RH 1010, e.g., as described below.

In some demonstrative aspects, processor 1036 may be configured to receive via communication interface 1030 the radar Rx information, which may include first radar Rx information from a first RH, e.g., RH 1012, and second radar Rx information from a second RH, e.g., RH 1014, e.g., as described below.

In some demonstrative aspects, processor 1036 may be configured to generate the radar information 1013, for example, based on joint processing of the first radar Rx information from the first RH 1012 and the second radar Rx information from the second RH 1014.

In some demonstrative aspects, radar processing unit 1034 may be configured to perform signal processing of the radar communications performed by RHs 1010.

In some demonstrative aspects, for example, radar processing unit 1034 may be configured to perform AoA processing, Inter-frame processing, e.g., Synthetic Aperture Radar (SAR) processing, detection, reporting, interference management, and/or any other additional or alternative functionalities.

In some demonstrative aspects, radar system 1001 may be implemented to provide a technical solution to support coherent operation, e.g., phase level coherency, of the plurality of RHs 1010.

In some demonstrative aspects, radar system 1001 may be implemented to provide a technical solution to support central processing of radar information of the plurality of RHs 1010, for example, by radar processing unit 1034. Accordingly, radar system 1001 may be implemented to provide a technical solution to support joint processing, e.g., coherent or incoherent joint processing, and/or data based or model based joint processing, of radar information of the plurality of RHs 1010.

In some demonstrative aspects, radar system 1001 may be implemented to provide a technical solution to support a "local" coherent MS implementation, e.g., with a relatively wide effective aperture.

In some demonstrative aspects, radar system 1001 may be implemented to provide a technical solution to support a distributed MIMO array providing a very wide aperture, for example, with reduced complexity.

In some demonstrative aspects, radar system 1001 may be implemented to provide a technical solution to support ease of installation. For example, a form factor of an RH 1010, e.g., including an antenna, may be as small as O(1 cm). Accordingly, the plurality of RHs 1010 may be installed almost anywhere in a vehicle, e.g., even at an edge of a windshield of the vehicle. For example, the plurality of RHs 1010 may be located to provide an improved FoV and/or point of view for system 1001. In one example, an RH 1010 may be positioned at a relatively high position, e.g., on a roof of a vehicle, for example, to provide an improved radar image.

In some demonstrative aspects, radar system 1001 may be implemented to provide a technical solution to support using of small, compact, low power and/or light weight RHs 1010. For example, some or all processing capabilities, which may be major heat generators and power-hungry elements of a radar system may be implemented at a central/main processor, e.g., radar processing unit 1034. Accordingly, radar system 1001 may be implemented to provide a technical solution to support reduced power consumption and/or heat dissipation real states.

In some demonstrative aspects, radar system 1001 may be implemented to provide a technical solution to support a MS radar system configuration and/or a distributed antenna scheme, which may provide superior performance.

In some demonstrative aspects, radar system 1001 may be implemented to provide a technical solution to leverage scale to yield an economic design, e.g., as described below.

In one example, an installation position of radar processing unit 1034 may be arbitrary and, accordingly, the installation position may enable vehicle and/or equipment manufacturers, e.g., Original Equipment Manufacturers (OEMs), to optimize radar system installation, for example, for power distribution, weight balancing, heat dissipation, and/or the like.

In some demonstrative aspects, radar system 1001 may be implemented to provide a technical solution to support a single-power and/or single heat dissipation system, e.g., which may be applied only for radar processing unit 1034.

In some demonstrative aspects, radar system 1001 may be implemented to provide a technical solution to support a single data connection to a vehicle system, e.g., from radar processing unit 1034.

In some demonstrative aspects, radar system 1001 may be implemented to provide a technical solution to support a software implementation of radar processing (partial or full) in a vehicular processor and/or controller, for example, a vehicle Domain Control Unit (DCU), a Zone Control Unit (ZCU), an Electronic Control Unit (ECU), a High Power Computer (HPC) of the vehicle, and/or the like.

In some demonstrative aspects, radar system 1001 may be implemented to provide a technical solution to support a single Baseband Processing Unit (BPU), e.g., a single radar processor or radar MicroProcessor Unit (MPU). For example, processor 1036 may be configured to process signals from the plurality of RHs 1010. Accordingly, a number of different BPU chips may be reduced. Therefore, better and/or more efficient stock and/or product line management may be achieved.

In some demonstrative aspects, radar system 1001 may be implemented to provide a technical solution to support sharing of processing resources between multiple radars, e.g., as described below.

In some demonstrative aspects, radar system 1001 may be implemented to provide a technical solution to support sharing of one or more peripheral resources, for example, a memory, a storage, an Inertial Measurement Unit (IMU), a power management, e.g., a Power Management Integrated Circuit (PMIC), or the like, between multiple radars.

In some demonstrative aspects, radar system 1001 may be implemented to provide a technical solution to support joint processing, e.g., fusion, of radar information from multiple radars.

In some demonstrative aspects, radar system 1001 may be implemented to provide a technical solution to support a centralized implementation of control plane functionality, e.g., management, secure boot, Functional Safety (FuSa), or the like.

In some demonstrative aspects, radar system 1001 may be implemented to provide a technical solution to support improved diversity and/or efficiency, for example, by decoupling between a radar processing unit and the RHs, for example, as long as they adhere to a same interconnect.

In one example, some vehicles, e.g., higher end vehicles, may be installed with higher end RHs, radar processing units and/or both, while other vehicles, e.g., lower end vehicles, may be installed with lower end RHs, radar processing units and/or both. For example, the higher end radar processing units may be utilized to provide additional features and/or access computation capacity.

In some demonstrative aspects, radar system 1001 may be implemented to provide a technical solution to support product de-coupling, e.g., of next generation products.

In one example, one or more of the RHs 1010 may be upgraded to a next generation, while the radar processing unit 1034 may remain at a configuration of a current generation, e.g., while having a SW update.

In another example, the radar processing unit 1034 may be upgraded, while, one or more of the RHs 1010 may remain at the same configuration.

In some demonstrative aspects, radar system 1001 may be implemented to provide a technical solution to support implementation of various types of RHs 1010, for example, RHs having large arrays versus RHs having small arrays, RHs having uniform arrays versus RHs having non-uniform arrays, and/or the like.

In some demonstrative aspects, radar system 1001 may be configured to process radar information via a radar processing path, e.g., as described below.

In some demonstrative aspects, the radar processing path may include, for example, RF and/or analog components, e.g., including RF antennas to transmit radar Tx signals and/or to receive radar Rx signals, RF chains, e.g., including RF Tx chains and/or RF Rx chains, and/or one or more analog chains, e.g., including analog Tx chains to process analog radar Tx signals and/or Rx analog chains to process analog radar Rx signals.

In some demonstrative aspects, the radar processing path may include, for example, digital processing components, e.g., compute algorithm engines, to digitally process the radar information. For example, the radar processing path may include one or more processors configured to implement cross-correlation processing, e.g., range processing, to determine range information, for example, corresponding to a plurality of range bins; Doppler processing to determine Doppler information, for example, corresponding to a plurality of range-Doppler (RD) bins; AoA processing, e.g., to determine AoA information; tracking processing, e.g., stateful tracking; clustering and/or object detection; and/or one or more additional or alternative processing.

Figure 11:
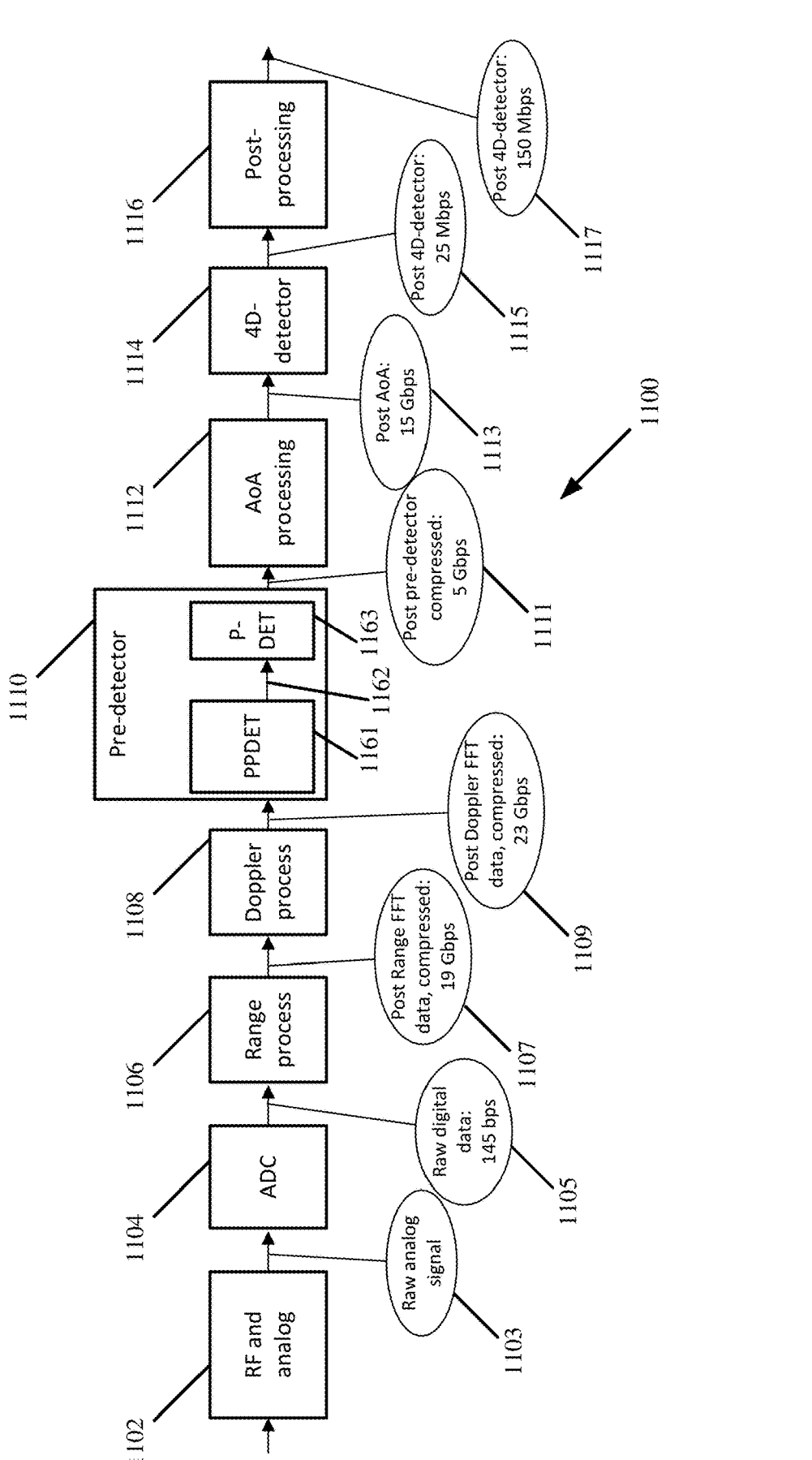
FIG. 11 is a schematic illustration of a radar processing path, in accordance with some demonstrative aspects.

Reference is made to FIG. 11, which schematically illustrates a radar processing path 1100, in accordance with some demonstrative aspects. For example, radar system 1001 (FIG. 1) may be configured to implement one or more elements, components, operations and/or functionalities of radar processing path 1100.

In some demonstrative aspects, as shown in FIG. 11, radar processing path 1100 may include an RF and analog stage 1102, which may be configured to provide analog radar information 1103, e.g., in the form of raw analog signals. For example, analog radar information 1103 may be based on radar RF Rx signals received by one or more Rx antennas, e.g., based on radar RF Tx signals transmitted via one or more Tx antennas.

In some demonstrative aspects, as shown in FIG. 11, radar processing path 1100 may include an Analog to Digital Converter (ADC) stage 1104, which may be configured to convert the analog radar information 1103 into digital radar information 1105, e.g., in the form of raw digital data. For example, the digital radar information 1105 may include digital radar Rx signals representing the radar RF Rx signals.

In some demonstrative aspects, as shown in FIG. 11, radar processing path 1100 may include a range processing stage 1106, which may be configured to generate post range processing information 1107, for example, based on the analog radar information 1105. For example, the range processing stage 1106 may include cross-correlation processing of the analog radar information 1105. For example, the post range processing information 1107 may include energy information, e.g., based on the digital radar Rx signals, in a plurality of range (R) bins.

In some demonstrative aspects, as shown in FIG. 11, radar processing path 1100 may include a Doppler processing stage 1108, which may be configured to generate Range-Doppler (RD) information 1109, for example, based on the post range processing information 1107.

In some demonstrative aspects, the RD information 1109 may include, for example, information corresponding to a plurality of RD bins, e.g., as described below.

In some demonstrative aspects, the plurality of RD bins may correspond to a plurality of combinations between the plurality of range bins and a plurality of Doppler (D) bins. For example, an RD bin corresponding to a combination of a range bin and a Doppler bin may include energy information, e.g., based on the digital radar Rx signals, corresponding to the combination of the range bin and the Doppler bin.

In some demonstrative aspects, the RD information 1109 corresponding to an RD bin may include, for example, a plurality of energy values, e.g., corresponding the RD bin.

In some demonstrative aspects, the plurality of energy values, e.g., corresponding the RD bin, may include, for example, energy values corresponding to a plurality of virtual antenna elements of a virtual antenna, e.g., as described below.

In some demonstrative aspects, the virtual antenna may be based on the one or more Tx antennas and the one or more Rx antennas, e.g., as described below.

In some demonstrative aspects, a virtual antenna element may represent a combination of an Rx antenna and a Tx antenna.

For example, the plurality of energy values corresponding the RD bin may include a plurality of energy values corresponding to a respective plurality of different combinations of an Rx antenna from the one or more Rx antennas and a Tx antenna from the one or more Tx antennas.

In some demonstrative aspects, as shown in FIG. 11, radar processing path 1100 may include a detection (also referred to as "Pre-detector" (PDET)) processing stage 1110, which may be configured to generate post pre-detector information 1111, for example, based on the RD information 1109, e.g., as described below.

In some demonstrative aspects, the post pre-detector information 1111 may include filtered information corresponding to one or more selected RD bins, which are selected, for example, for further processing, for example, for AoA processing, e.g., as described below.

In some demonstrative aspects, as shown in FIG. 11, radar processing path 1100 may include an AoA processing stage 1112, which may be configured to generate post AoA processing information 1113, for example, based on the post pre-detector information 1111. For example, the post AoA processing information 1113 may include AoA information corresponding to the one or more selected RD bins.

In some demonstrative aspects, as shown in FIG. 11, radar processing path 1100 may include a detection stage 1114, which may be configured to generate object detection information 1115, for example, based on the post AoA processing information 1113. For example, detection stage 1114 may include a four-dimensional (4D) detector, e.g., may be configured to generate the object detection information 1115, for example, based on 4D detection processing of 4D image information.

In some demonstrative aspects, as shown in FIG. 11, radar processing path 1100 may include a post processing stage 1116, which may be configured to generate processed object detection information 1117, for example, based on the object detection information 1115.

In some demonstrative aspects, as shown in FIG. 11, a data rate of the data generated by the various processing stages of radar processing path 1100 may vary along the radar processing path 1100.

For example, as shown in FIG. 11, the post range processing information 1107 may be provided at a relatively high data rate, e.g., in a range of about 15-20 Giga bits per second (Gbps).

For example, as shown in FIG. 11, the RD information 1109 may be provided at a relatively high data rate, e.g., in a range of about 20-25 Gbps.

For example, as shown in FIG. 11, the post pre-detector information 1111 may be provided at a data rate, which may be relatively lower than the data rate of the RD information 1109, e.g., in a range of about 1-10 Gbps.

For example, as shown in FIG. 11, the object detection information 1115 may be provided at a relatively low data rate, e.g., less than 1 Gbps.

For example, as shown in FIG. 11, the processed object detection information 1117 may be provided at a relatively low data rate, e.g., less than 1 Gbps.

In other aspects, the data may be generated by the various processing stages of radar processing path 1100 at any other suitable data rates.

In some demonstrative aspects, a partitioning (also referred to as "radar processing path partitioning" or "radar partitioning") of the processing stages of radar processing path 1100 between an RH, e.g., an RH 1010 (FIG. 10), and a radar processor, e.g., radar processor unit 1034 (FIG. 10), may be configured based on one or more technical considerations and/or criteria, e.g., as described below.

In some demonstrative aspects, it may be technically advantageous to implement the radar partitioning as close as possible to the RF antennas, for example, to provide a technical solution to support implementation of RHs, which may be relatively small and simple, e.g., "stupid". For example, the implementation of relatively small RHs may provide a technical solution to support implementation of RHs in relatively small spaces, e.g., car walls.

However, a data bandwidth (BW) for communication of data between the RHs and the radar processor may be limited, e.g., based on a data BW of a communication interconnect between the RHs and the data processor. For example, a communication interconnect may be able to support a data BW of about 10 Gbps, or a data BW of less than 10 Gbps, e.g., a data BW of about 5-10 Gbps, a data BW of about 1-5 Gbps, a data BW of about 1 Gbps, or any other suitable data rate.

In some demonstrative aspects, it may be technically advantageous to implement the radar partitioning after performing at least part of the PDET processing stage 1110, for example, at a point where a data rate is lower than, e.g., significantly lower than, the data rate of RD information 1109, e.g., as described below.

In some demonstrative aspects, in some use cases, scenarios and/or implementations there may be a need to address one or more technical issues, for example, in case the PDET processing stage 1110 is fully implemented at an RH.

For example, the PDET processing stage 1110 may be configured to perform preliminary RD filtering, for example, in order to provide a technical solution to reduce compute resources at the AoA processing stage 1112.

For example, PDET processing stage 1110 may be implemented as a fully preconfigured processing stage, e.g., as a fully hard-wired (hard-coded) PDET processing stage, which may be implemented by an RH. However, such an implementation may provide less, or even no, flexibility, e.g., in updating one or more algorithms and/or functionalities of the PDET processing stage 1110.

For example, PDET processing stage 1110 may be implemented as a fully configurable processing stage, e.g., by a Digital Signal Processor (DSP) chip, which may be implemented by an RH.

However, implementing one or more DSPs for PDET processing at an RH may result in the RH having a relatively large size, and/or a relatively high power consumption.

For example, implementing one or more DSPs for PDET processing at an RH may result in a radar system including a relatively large number of DSPs.

For example, implementing one or more DSPs for PDET processing at an RH may result in excessive, or "wasted", processing resources.

In one example, a double number of DSPs may be used, e.g., a DSP at the RH for PDET processing and a DSP at the radar processor for AoA processing, although the same DSP infrastructure may be capable of supporting the PDET processing and the AoA processing, e.g., which may be performed non-simultaneously.

In some demonstrative aspects, the PDET processing stage 1110 may be split into a plurality of PDET processing sub-stages, e.g., as described below.

In some demonstrative aspects, the plurality of PDET processing sub-stages may include a first PDET processing sub-stage 1161 (also referred to as "preliminary PDET" or pre-PDET (PPDET) stage), which may be configured for implementation by an RH, e.g., an RH 1010 (FIG. 10), e.g., as described below.

In some demonstrative aspects, the plurality of PDET processing sub-stages may include a second PDET processing sub-stage 1163 also referred to as "pr-detector" stage), which may be configured for implementation by another processor, for example, a radar processor, e.g., radar processor unit 1034 (FIG. 10), e.g., as described below.

In some demonstrative aspects, the first PDET processing sub-stage 1161, which may be configured for implementation by an RH, e.g., an RH 1010 (FIG. 10), may be configured to include preliminary PDET processing, for example, to perform preliminary RD bin filtering, e.g., as described below.

In some demonstrative aspects, the first PDET processing sub-stage 1161 may be configured to filter-out a relatively large portion of the RD bins in RD information 1109. In one example, the first PDET processing sub-stage 1161 may be configured to filter-out about 70%, or any other portion, of the RD bins in RD information 1109.

In some demonstrative aspects, the first PDET processing sub-stage 1161 may be configured to provide preliminary filtered information 1162, which may have a data rate suitable for communication over a communication interconnect, e.g., communication interconnect 1039 (FIG. 10), between the RH and the other processor, e.g., radar processor, e.g., as described below.

In some demonstrative aspects, the first PDET processing sub-stage 1161 may be configured to filter-out a relatively large portion of the RD bins in RD information 1109, for example, such that the preliminary filtered information 1162 may have a data bandwidth, which may be significantly reduced, e.g., compared to the data BW of the RD information 1109.

For example, the first PDET processing sub-stage 1161 may be configured to provide the preliminary filtered information 1162 having a data BW, which is suitable for transmission over the communication interconnect, e.g., communication interconnect 1039 (FIG. 10), between the RH and the radar processor, e.g., as described below.

In some demonstrative aspects, the first PDET processing sub-stage 1161 may be configured to compress the preliminary filtered information 1162, for example, to provide compressed preliminary filtered information 1162, which may have a data rate suitable for communication over the communication interconnect, e.g., communication interconnect 1039 (FIG. 10), between the RH and the radar processor, e.g., as described below.

In some demonstrative aspects, the first PDET processing sub-stage 1161 may be configured to perform the preliminary PDET processing, for example, based on coarse AoA processing of the RD information 1109, e.g., as described below.

In some demonstrative aspects, the first PDET processing sub-stage 1161 may be configured to perform the preliminary PDET processing, for example, based on coarse azimuth AoA processing of the RD information 1109, e.g., as described below.

In some demonstrative aspects, the coarse AoA processing, e.g., the coarse azimuth AoA processing, may be configured to detect one or more RD bins, which may potentially include, e.g., which may be more likely to include, one or more real targets, e.g., as described below.

In some demonstrative aspects, the first PDET processing sub-stage 1161 may be implemented as a preconfigured processing stage, e.g., a hard-wired (hard-coded) processing stage, which may be implemented by an RH, e.g., as described below.

In some demonstrative aspects, the first PDET processing sub-stage 1161 may be implemented as a preconfigured processing stage, e.g., a hard-coded processing stage, for example, to provide a technical solution to support implementation of the first PDET processing sub-stage 1161 as part of a simple, e.g., "stupid", implementation of an RH, e.g., as described below.

In some demonstrative aspects, the second PDET processing sub-stage 1163 may be configured to perform additional PDET processing, for example, based on the preliminary filtered information 1162, e.g., as described below.

In some demonstrative aspects, the second PDET processing sub-stage 1163 may be configured to perform extended PDET processing, e.g., full-blown PDET processing, for example, based on the RD bins of the preliminary filtered information 1162.

For example, in case the first PDET processing sub-stage 1161 is capable of filtering-out about 70% of the RD bins of RD information 1109, the second PDET processing sub-stage 1163 may be utilized to apply the extended PDET processing to RD bins od the preliminary filtered information 1162, e.g., the remaining 30% of the RD bins.

In some demonstrative aspects, the second PDET processing sub-stage 1163 may be implemented by one or more software (SW) components, e.g., one or more DSPs, for example, at the radar processor 1034 (FIG. 10).

In some demonstrative aspects, a processor, for example, a radar processor, e.g., radar processor 1034 (FIG. 10), may be configured to receive the preliminary filtered information 1162 from an RH, e.g., from an RH 1010 (FIG. 10), via a communication interconnect, e.g., communication interconnect 1039 (FIG. 1). For example, radar processor, e.g., radar processor 1034 (FIG. 10), may be configured to perform one or more operations of the second PDET processing sub-stage 1163, for example, based on the preliminary filtered information 1162, e.g., as described below.

In some demonstrative aspects, the second PDET processing sub-stage 1163 may include spatial analysis of an RD bin, e.g., each RD bin, of the RD bins of preliminary filtered information 1162.

In some demonstrative aspects, the spatial analysis of the RD bin may be configured to detect one or more active regions, for example, based on energy values in the RD bin.

In some demonstrative aspects, the second PDET processing sub-stage 1163 may include filtering of active elements, for example, utilizing a peak to average detection logic.

For example, the second PDET processing sub-stage 1163 may include filtering, e.g., more accurate filtering, of active azimuth elements, e.g., virtual antenna rows, for example, based on peak to average detection logic.

In some demonstrative aspects, the second PDET processing sub-stage 1163 may include resolving Doppler ambiguities, for example, based on a full coherent summation.

In other aspects, the second PDET processing sub-stage 1163 may include any other additional or alternative operations and/or functionalities.

Figure 12:
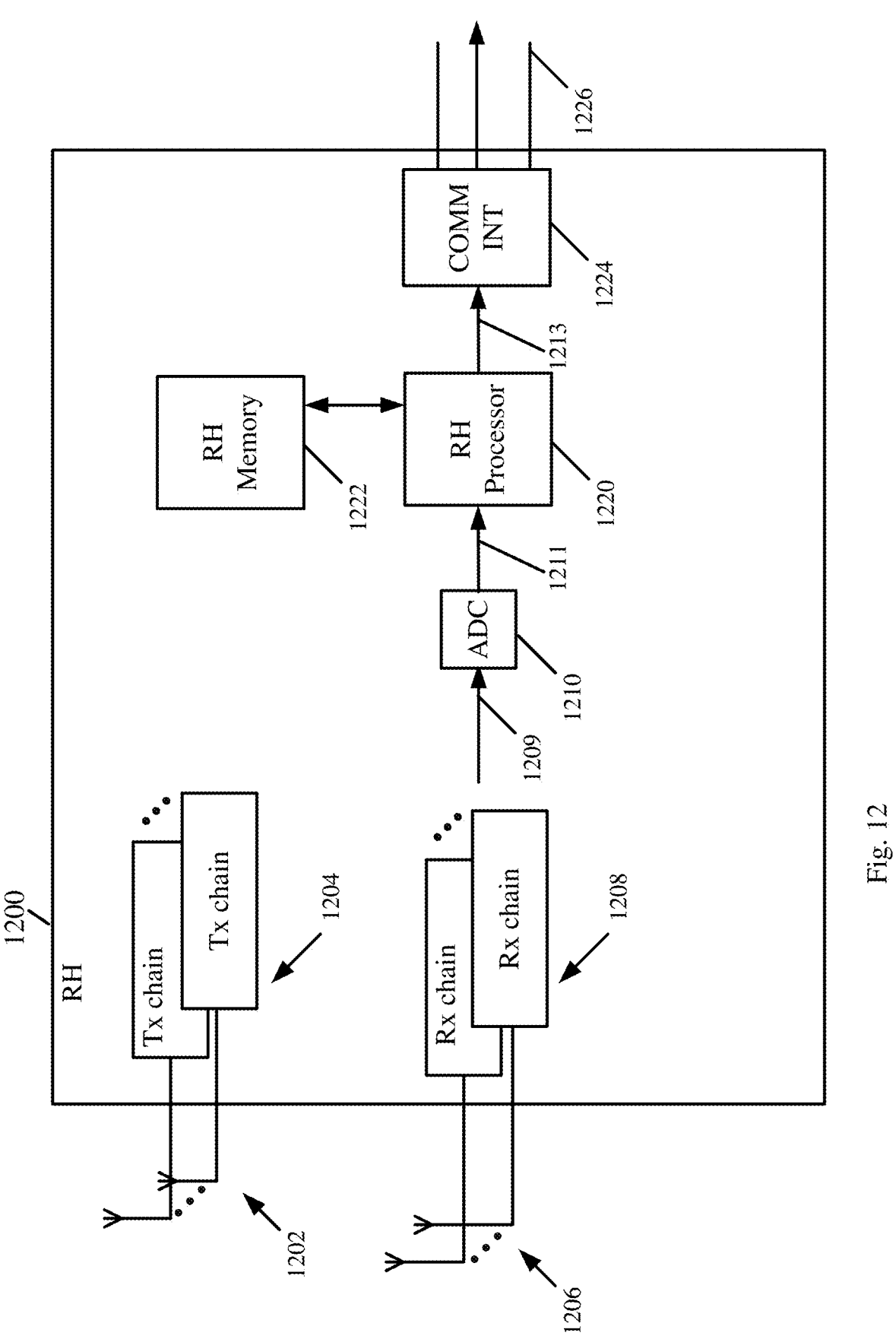
FIG. 12 is a schematic illustration of a radar Radio Head (RH), in accordance with some demonstrative aspects.

Reference is made to FIG. 12, which schematically illustrates a radar RH 1200, in accordance with some demonstrative aspects. For example, an RH 1010 (FIG. 1) may include one or more components and/or elements of RH 1200, and/or my perform one or more operations and/or functionalities of RH 1200.

In some demonstrative aspects, RH 1200 may include one or more Tx antennas 1202 to transmit radar RF Tx signals, e.g., as described above.

In some demonstrative aspects, RH 1200 may include one or more RF Tx chains 1204 to transmit the radar RF Tx signals via the one or more Tx antennas 1202, e.g., as described above.

In some demonstrative aspects, RH 1200 may include one or more Rx antennas 1206 to receive radar RF Rx signals, for example, based on the radar RF Tx signals transmitted by the one or more Tx antennas 1202, e.g., as described above.

In some demonstrative aspects, RH 1200 may include one or more RF Rx chains 1208 to generate analog radar Rx signals 1209, for example, based on the radar RF Rx signals received by the one or more Rx antennas 1206.

In some demonstrative aspects, RH 1200 may include an ADC 1210 to generate digital radar Rx signals 1211 based on the analog radar Rx signals 1209. For example, the digital radar Rx signals 1211 may represent the radar RF Rx signals received by the one or more Rx antennas 1206.

In some demonstrative aspects, RH 1200 may include an RH processor 1220, which may be configured to process the digital radar Rx signals 1211, e.g., as described below.

In some demonstrative aspects, RH processor 1220 may include, or may be implemented, partially or entirely, by circuitry and/or logic, e.g., one or more processors including circuitry and/or logic, memory circuitry and/or logic. Additionally or alternatively, one or more functionalities of RH processor 1220 may be implemented by logic, which may be executed by a machine and/or one or more processors, e.g., as described below.

In some demonstrative aspects, at least part of the functionality of RH processor 1220, e.g., some or all of the functionality of RH processor 1220, may include, or may be implemented, partially or entirely, by preconfigured circuitry and/or logic, for example, as a hard-wired (hard-coded) processor.

In other aspects, at least part of the functionality of RH processor 1220, e.g., some or all of the functionality of RH processor 1220, may include, or may be implemented, partially or entirely, by programmable and/or configurable circuitry and/or logic, for example, by one or more DSPs and/or SW-based processors.

In some demonstrative aspects, RH processor 1220 may be configured to perform one or more operations and/or functionalities of one or more processing stages of radar processing path 1100 (FIG. 11), e.g., as described below.

In some demonstrative aspects, RH processor 1220 may be configured to perform one or more operations and/or functionalities of range processing stage 1106 (FIG. 11), e.g., as descried below.

In some demonstrative aspects, RH processor 1220 may be configured to perform one or more operations and/or functionalities of Doppler processing stage 1108 (FIG. 11), e.g., as described below.

In some demonstrative aspects, RH processor 1220 may be configured to perform one or more operations and/or functionalities of PDET processing stage 1110 (FIG. 11), e.g., as described below.

In some demonstrative aspects, RH processor 1220 may be configured to perform one or more operations and/or functionalities of PDET processing sub-stage 1161 (FIG. 11), e.g., as described below.

In some demonstrative aspects, RH processor 1220 may be configured to determine RD information corresponding to a plurality of RD bins, for example, based on the digital radar Rx signals 1211, e.g., as described below.

For example, RH processor 1220 may be configured to determine the RD information corresponding to the plurality of RD bins, for example, based on the range processing stage 1106 (FIG. 11) and/or Doppler processing stage 1108 (FIG. 11).

In some demonstrative aspects, RH processor 1220 may be configured to determine RD information corresponding to an RD bin to include a plurality of energy values corresponding the RD bin, e.g., as described above.

In some demonstrative aspects, the plurality of energy values corresponding the RD bin may include, for example, energy values corresponding to a plurality of virtual antenna elements, e.g., as described below.

In some demonstrative aspects, the plurality of virtual antenna elements may be based, for example, on the one or more Tx antennas 1202 and the one or more Rx antennas 1206, e.g., as described below.

In some demonstrative aspects, a virtual antenna element may represent, for example, a combination of an Rx antenna and a Tx antenna.

In some demonstrative aspects, RH processor 1220 may be configured to detect one or more detected RD bins, for example, based on the RD information, e.g., as described below.

In some demonstrative aspects, RH processor 1220 may be configured to provide filtered RD information 1213, which may include, for example, RD information corresponding to the one or more detected RD bins, e.g., as described below.

In some demonstrative aspects, RH processor 1220 may be configured to provide the filtered RD information 1213, for example, by configuring the filtered RD information 1213 to exclude RD information of one or more excluded RD bins, which are not included in the one or more detected RD bins, e.g., as described below.

In some demonstrative aspects, RH 1200 may include a communication interface 1224, which may be configured to send the filtered RD information 1213 to a radar processor, e.g., radar processor 1034 (FIG. 10), via a communication interconnect 1226, e.g., communication interconnect 1039 (FIG. 10).

In some demonstrative aspects, the communication interface 1224 may include a 10 Gigabit Ethernet (GbE) interface.

In some demonstrative aspects, the communication interface 1224 may include a Mobile Industry Processor Interface (MIPI).

In other aspects, the communication interface 1224 may include any other additional or alternative type of communication interface, which may be configured to communicate over any other additional or alternative type of communication interconnect.

In some demonstrative aspects, RH processor 1220 may be configured, for example, to detect the one or more detected RD bins according, for example, to an azimuth-based detection criterion to detect potential targets along an azimuth axis, e.g., as described below.

In some demonstrative aspects, RH processor 1220 may be configured, for example, to determine a plurality of azimuth-based values for an RD bin, for example, based on the plurality of energy values corresponding to the RD bin, e.g., as described below.

In some demonstrative aspects, RH processor 1220 may be configured, for example, to determine whether or not the RD bin is to be included in the one or more detected RD bins, for example, based on a comparison between the plurality of azimuth-based values for the RD bin and a detection threshold value, e.g., as described below.

In some demonstrative aspects, the detection threshold value may be configured to provide the filtered RD information having a data bandwidth, which is supported by the communication interconnect 1226, e.g., as described below.

In some demonstrative aspects, the detection threshold value may be configured to provide the filtered RD information having a data bandwidth of up to 10 Giga-bit-per-second (Gbps), e.g., in case the communication interconnect 1226 supports a data BW of up to 10 Gbps.

In some demonstrative aspects, the detection threshold value may be configured to provide the filtered RD information having a data bandwidth of less than 7.5 Gbps, e.g., in case the communication interconnect 1226 supports a data BW of up to 5 Gbps.

In some demonstrative aspects, the detection threshold value may be configured to provide the filtered RD information having a data bandwidth of less than 5 Gbps, e.g., in case the communication interconnect 1226 supports a data BW of up to 5 Gbps.

In some demonstrative aspects, the detection threshold value may be configured to provide the filtered RD information having a data bandwidth of up to 3 Gbps, e.g., in case the communication interconnect 1226 supports a data BW of up to 3 Gbps.

In some demonstrative aspects, the detection threshold value may be configured to provide the filtered RD information having a data bandwidth of up to 1 Gbps, e.g., in case the communication interconnect 1226 supports a data BW of up to 1 Gbps.

In other aspects, the detection threshold value may be configured to provide the filtered RD information having any other suitable data bandwidth, e.g., based on the data BW supported by the communication interconnect 1226.

In some demonstrative aspects, RH processor 1220 may be configured, for example, to determine the plurality of azimuth-based values for the RD bin based, for example, on a plurality of sets of Fast-Fourier-Transform (FFT) values for the RD bin, e.g., as described below.

In some demonstrative aspects, the plurality of sets of FFT values for the RD bin may correspond, for example, to a respective plurality of antenna rows of the virtual antenna based on the one or more Tx antennas and the one or more Rx antennas, e.g., as described below.

In some demonstrative aspects, a set of FFT values corresponding to an antenna row may be based, for example, on an FFT applied to a set of energy values corresponding to a respective set of antenna elements in the antenna row, e.g., as described below.

In some demonstrative aspects, RH processor 1220 may be configured, for example, to determine the plurality of azimuth-based values for the RD bin based, for example, on FFT values for a respective plurality of antenna columns of the virtual antenna, e.g., as described below.

In some demonstrative aspects, an azimuth-based value corresponding to an antenna column may include a value ("azimuth sum value"), which be based, for example, on a summation of a set of absolute FFT values corresponding to the antenna column, e.g., as described below.

In some demonstrative aspects, the azimuth-based value corresponding to the antenna column may be based, for example, on a non-coherent summation of the set of absolute FFT values corresponding to the antenna column, e.g., as described below.

In some demonstrative aspects, RH processor 1220 may be configured to determine the plurality of azimuth-based values for the RD bin, for example, in the form of a vector ("azimuth sum vector") of azimuth sum values corresponding to the RD bin, e.g., as described below.

In some demonstrative aspects, RH processor 1220 may be configured, for example, to determine that the RD bin is to be included in the one or more detected RD bins based, for example, on determination that at least one azimuth-based value of the plurality of azimuth-based values for the RD bin exceeds the detection threshold value e.g., as described below.

In some demonstrative aspects, RH processor 1220 may be configured, for example, to provide the filtered RD information 1213 to include azimuth-based information for the plurality of RD bins, e.g., as described below, In some demonstrative aspects, the azimuth-based information for an RD bin may include, for example, the plurality of azimuth-based values for an RD bin, e.g., as described below.

For example, RH processor 1220 may be configured to determine the azimuth-based information for an RD bin to include the azimuth sum vector corresponding to the RD bin.

In other aspects, the azimuth-based information may include any other additional or alternative information for the plurality of RD bins.

In some demonstrative aspects, RH processor 1220 may be configured, for example, to provide the filtered RD information 1213 to include the azimuth-based information for one or more, e.g., some or all, of the detected RD bins, which are included in the filtered RD information 1213.

In some demonstrative aspects, RH processor 1220 may be configured, for example, to provide the filtered RD information 1213 to include the azimuth-based information for one or more, e.g., some or all, of the excluded RD bins, which are excluded in the filtered RD information 1213.

For example, RH processor 1220 may be configured to provide the filtered RD information 1213 to include one or more azimuth sum vectors corresponding to one or more of the detected RD bins to be included in the filtered RD information 1213.

In some demonstrative aspects, RH processor 1220 may be configured, for example, to provide the filtered RD information 1213 to include statistical information based, for example, on the RD information corresponding to the plurality of RD bins, e.g., as described below.

For example, RH processor 1220 may be configured provide the filtered RD information 1213 to include one or more azimuth sum vectors corresponding to one or more of the excluded RD bins to be excluded from the filtered RD information 1213.

In some demonstrative aspects, the statistical information for an RD bin may include, for example, information based on an average energy of an RD bin.

In some demonstrative aspects, RH processor 1220 may be configured to determine the statistical information for an RD bin to include information representing an average energy of an RD bin, for example, based on an average of the plurality of azimuth-based values corresponding to the RD bin, e.g., as described below.

For example, RH processor 1220 may be configured to determine the statistical information for an RD bin to include information representing an average energy of an RD bin, for example, based on an average of the azimuth sum vector corresponding to the RD bin.

In other aspects, the statistical information for an RD bin may include any other additional or alternative statistical information for the RD bin.

In some demonstrative aspects, RH processor 1220 may be configured, for example, to provide the filtered RD information 1213 to include the statistical information for one or more, e.g., some or all, of the detected RD bins, which are included in the filtered RD information 1213.

For example, RH processor 1220 may be configured provide the filtered RD information 1213 to include averages of one or more azimuth sum vectors corresponding to one or more of the detected RD bins to be included in the filtered RD information 1213.

In some demonstrative aspects, RH processor 1220 may be configured, for example, to provide the filtered RD information 1213 to include the statistical information for one or more, e.g., some or all, of the excluded RD bins, which are excluded in the filtered RD information 1213.

For example, RH processor 1220 may be configured provide the filtered RD information 1213 to include averages of one or more azimuth sum vectors corresponding to one or more of the excluded RD bins to be excluded from the filtered RD information 1213.

For example, RH processor 1220 may be configured provide the filtered RD information 1213 to include the azimuth-based information, e.g., the azimuth sum vectors, and/or the statistical information corresponding to the azimuth sum vectors, for a plurality of RD bins, e.g., including detected RD bins, which are included in the filtered RD information 1213, and/or excluded RD bins, which are excluded from the filtered RD information 1213.

In one example, RH processor 1220 may be configured provide the filtered RD information 1213 to include the azimuth-based information, e.g., the azimuth sum vectors, and/or the statistical information corresponding to the azimuth sum vectors, for substantially all detected RD bins, which are included in the filtered RD information 1213.

In one example, RH processor 1220 may be configured provide the filtered RD information 1213 to include the azimuth-based information, e.g., the azimuth sum vectors, and/or the statistical information corresponding to the azimuth sum vectors, for substantially all excluded RD bins, which are excluded from the filtered RD information 1213.

In some demonstrative aspects, a radar processor, e.g., radar processor 1034 (FIG. 10), may be configured to process the filtered RD information 1213, for example, based on the azimuth-based information, e.g., the azimuth sum vectors, and/or the statistical information.

For example, the radar processor, e.g., radar processor 1034 (FIG. 10), may be configured to process the azimuth-based information, e.g., the azimuth sum vectors, and/or the statistical information, for example, to detect interference, e.g., in one or more particular azimuth angles.

In some demonstrative aspects, RH 1200 may include an RH memory 1222, which may be configured to locally store information processed by the RH processor 1220, e.g., as described below.

In some demonstrative aspects, RH processor 1220 may configured to store the filtered RD information 1213 in the RH memory 1222, e.g., as described below.

In some demonstrative aspects, communication interface 1224 may be configured to retrieve the filtered RD information 1213 from the RH memory 1222, for example, based on a bandwidth of the communication interconnect 1226, e.g., as described below.

In some demonstrative aspects, RH memory 1222 may include a Double Data Rate (DDR) memory.

In other aspects, RH memory 1222 may include an on-die static RAM (SRAM) memory, a High Bandwidth Memory (HBM), and/or any other additional or alternative suitable type of memory.

Reference is made to FIGS. 13A, 13B, 13C, 13D and 13E, which conceptually illustrate operations according to a filtering technique to generate filtered RD information, in accordance with some demonstrative aspects. For example, RH processor 1220 (FIG. 12) may be configured to perform one or more operations of the filtering technique of FIGS. 13A, 13B, 13C, 13D, and/or 13E, for example, to determine the filtered RD information 1213.

In some demonstrative aspects, the filtering technique may include processing RD information of a plurality of RD bins to detect one or more detected RD bins to be included in filtered RD information, e.g., as described below.

In some demonstrative aspects, the filtering technique may include determining whether information of an RD bins is to be included in the filtered RD information, or excluded from the filtered RD information, for example, based on RD information corresponding to the RD bin, e.g., as described below.

In some demonstrative aspects, RD information corresponding to an RD bin 1300 may include a plurality of energy values corresponding the RD bin, e.g., as described above.

Figure 13A:
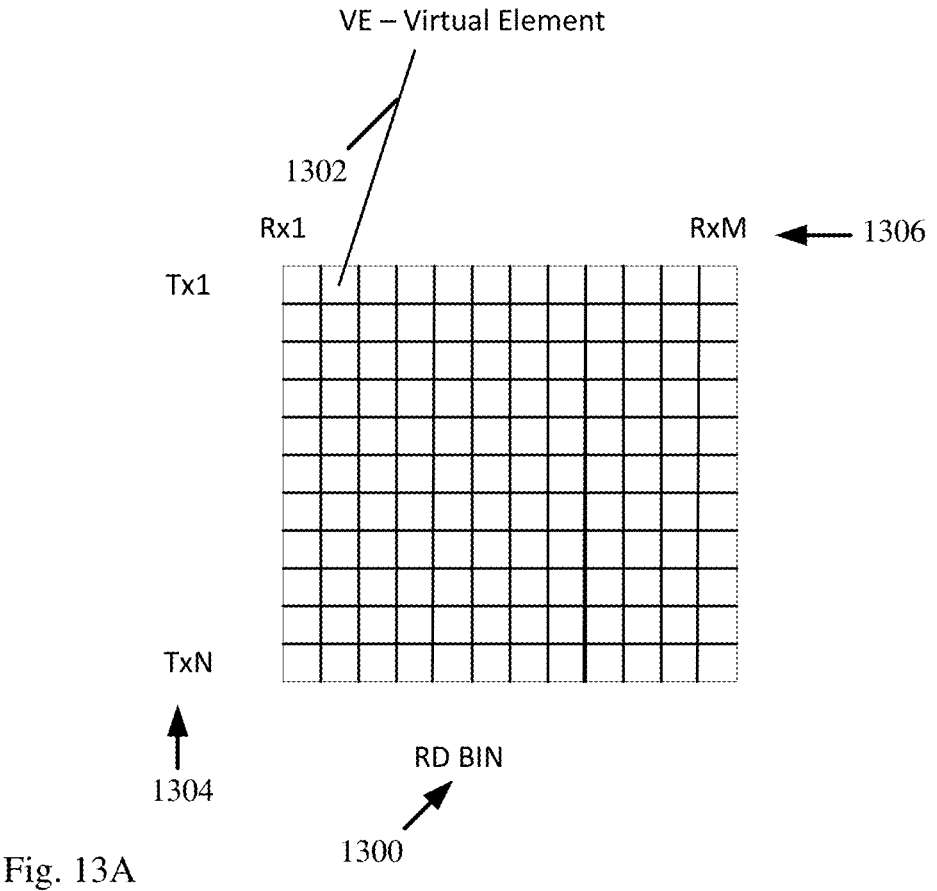
FIGS. 13A, 13B, 13C, 13D and 13E are conceptual illustrations of operations according to a filtering technique to generate filtered Range-Doppler (RD) information, in accordance with some demonstrative aspects.

In some demonstrative aspects, as shown in FIG. 13A, the plurality of energy values corresponding the RD bin 1300 may include, for example, energy values corresponding to a plurality of virtual antenna elements 1302, e.g., as described below.

In some demonstrative aspects, as shown in FIG. 13A, the plurality of virtual antenna elements 1302 may be based, for example, on a plurality of Tx antennas 1304 and a plurality of Rx antennas 1306, e.g., as described below.

For example, as shown in FIG. 13A, the virtual antenna may include N antenna rows, e.g., corresponding to N Tx antennas, and M antenna columns, e.g., corresponding to M Rx antennas.

In some demonstrative aspects, as shown in FIG. 13A, a virtual antenna element 1302 may represent, for example, a combination of an Rx antenna 1306 and a Tx antenna 1304.

Figure 13B:
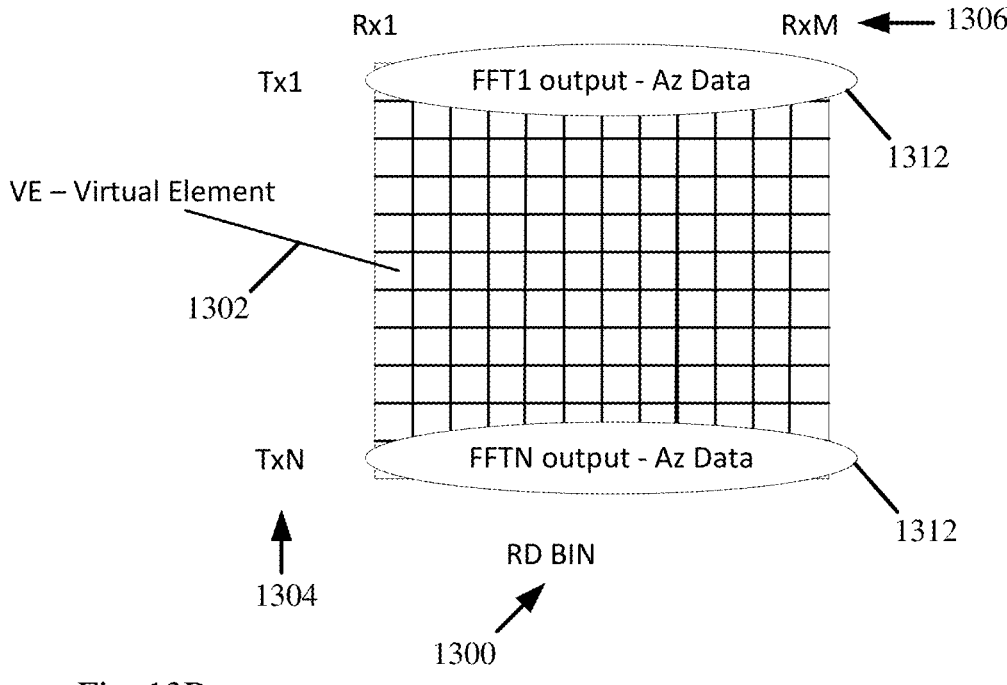

In some demonstrative aspects, as shown in FIG. 13B, the filtering technique may include determining a plurality of sets 1312 of FFT values for the RD bin, e.g., as described below.

In some demonstrative aspects, as shown in FIG. 13B, the plurality of sets 1312 of FFT values for the RD bin may correspond to a respective plurality of antenna rows of the virtual antenna.

In some demonstrative aspects, as shown in FIG. 13B, a set 1312 of FFT values corresponding to an antenna row may be based, for example, on an FFT applied to a set of energy values corresponding to a respective set of antenna elements 1302 in the antenna row.

For example, as shown in FIG. 13B, the plurality of sets 1312 of FFT values for the RD bin may include N sets 1312 of FFT values, for example, in case the virtual antenna includes N antenna rows.

In some demonstrative aspects, an RH processor, e.g., RH processor 1220 (FIG. 12), may be configured to determine the plurality of sets 1312 of FFT values for the RD bin, for example, by performing an FFT, e.g., per row of virtual antenna elements 1302.

For example, the plurality of sets 1312 of FFT values for the RD bin may include azimuth information corresponding to the plurality of rows of the virtual antenna elements 1302.

For example, an n-th set 1312 of FFT values corresponding to an m-th row of the virtual antenna elements 1302 may include azimuth information corresponding to the n-th row of the virtual antenna elements 1302.

Figure 13C:
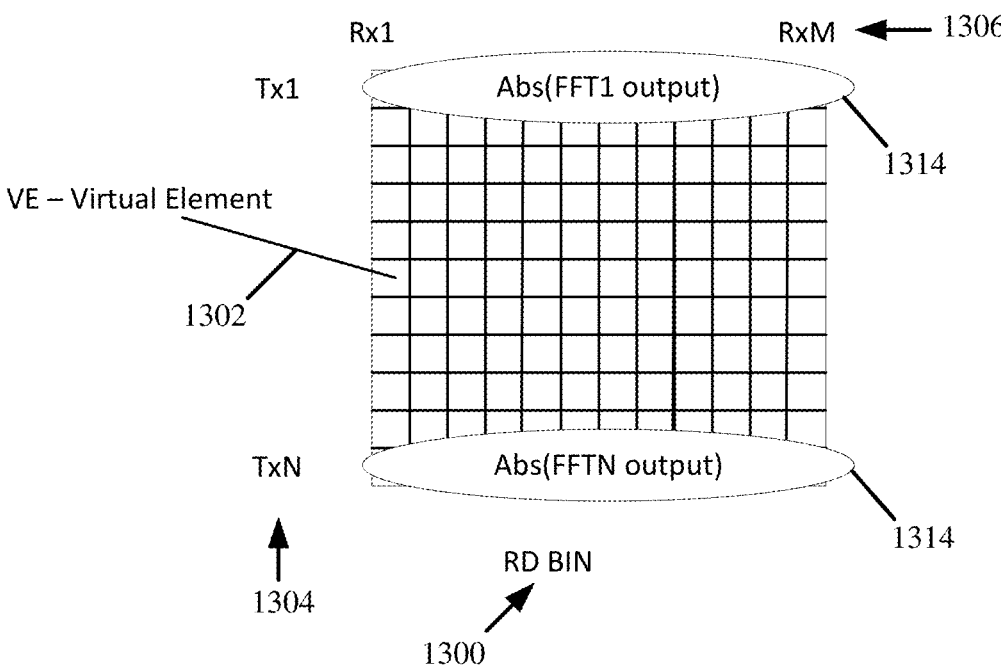

In some demonstrative aspects, as shown in FIG. 13C, the filtering technique may include determining a plurality of sets 1314 of absolute FFT values for the RD bin, for example, by applying an absolute function to each value of the plurality of sets 1312 (FIG. 13B) of FFT values for the RD bin.

Figure 13D:
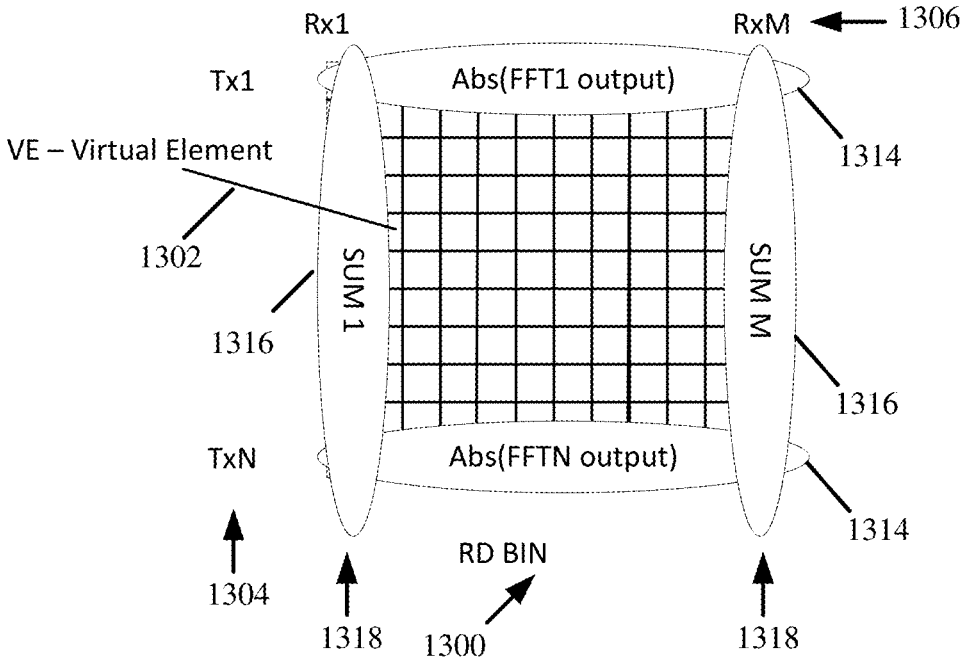

In some demonstrative aspects, as shown in FIG. 13D, the filtering technique may include determining a plurality of azimuth-based values 1316 for the RD bin, for example, based on the plurality of sets 1314 of absolute FFT values for the RD bin, e.g., as described below.

In some demonstrative aspects, as shown in FIG. 13D, the plurality of azimuth-based values 1316 for the RD bin may be determined, for example, based on FFT values for a respective plurality of antenna columns 1318 of the virtual antenna.

In some demonstrative aspects, as shown in FIG. 13D, the plurality of azimuth-based values 1316 for the RD bin may be determined, for example, based on a non-coherent summation of rows of virtual antenna element 1302.

In some demonstrative aspects, as shown in FIG. 13D, an azimuth-based value 1316 corresponding to an antenna column 1318 may be determined, for example, based on a summation of a set of absolute FFT values corresponding to the antenna column 1318.

In some demonstrative aspects, as shown in FIG. 13D, the azimuth-based value 1316 corresponding to the antenna column 1318 may be determined, for example, based on a non-coherent summation of the set of absolute FFT values corresponding to the antenna column 1318.

Figure 13E:
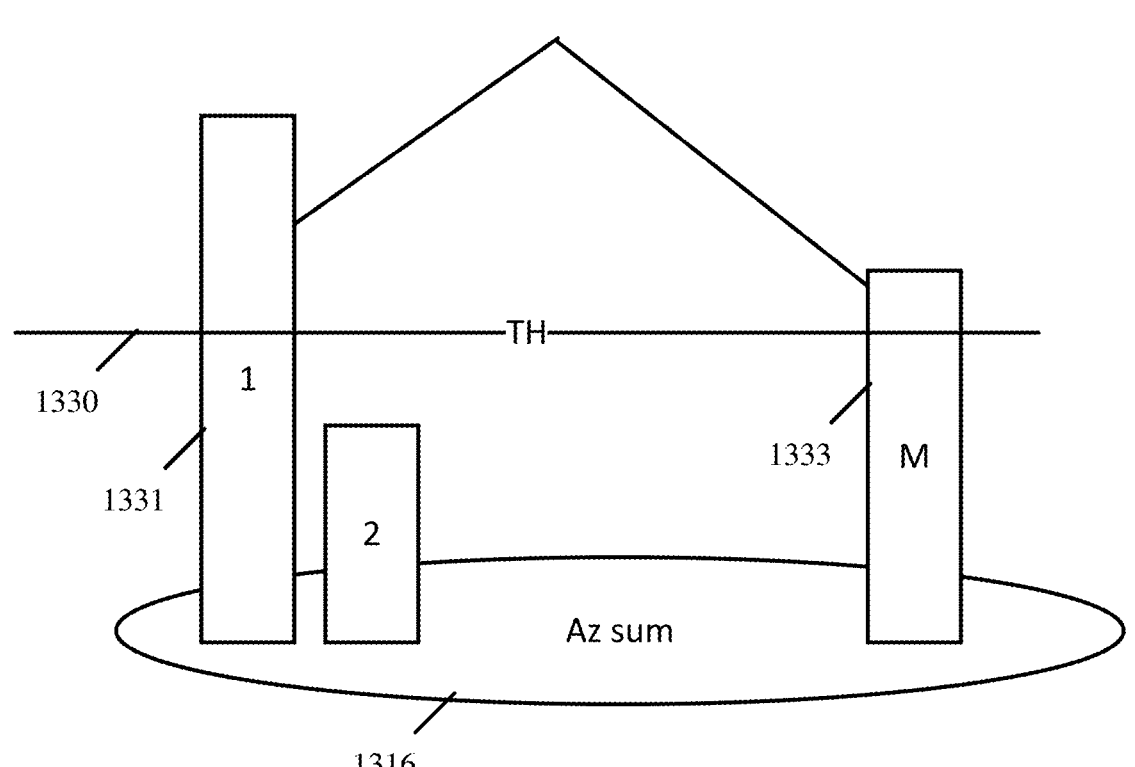

In some demonstrative aspects, as shown in FIG. 13E, the filtering technique may include determining whether or not the RD bin is to be identified as a detected RD bin, e.g., which is to be included in the filtered RD information, for example, based on a comparison between the plurality of azimuth-based values 1316 for the RD bin and a detection threshold value 1330.

In some demonstrative aspects, as shown in FIG. 13E, the filtering technique may include determining that the RD bin is to be identified as a detected RD bin, e.g., which is to be included in the filtered RD information, for example, based on determination that at least one azimuth-based value of the plurality of azimuth-based values 1316 for the RD bin exceeds the detection threshold value 1330.

For example, as shown in FIG. 13E, it may be determined that a first azimuth-based value 1331 and a second azimuth-based value 1333 exceed the detection threshold value 1330. Accordingly, it may be determined that the RD bin is to be identified as a detected RD bin, e.g., which is to be included in the filtered RD information.

In some demonstrative aspects, the filtering technique may include determining that the RD bin is to be identified as a non-detected RD bin, e.g., which is to be excluded the filtered RD information, for example, based on determination that each the plurality of azimuth-based values 1316 for the RD bin does not exceed the detection threshold value 1330.

Figures 14A, 14B:
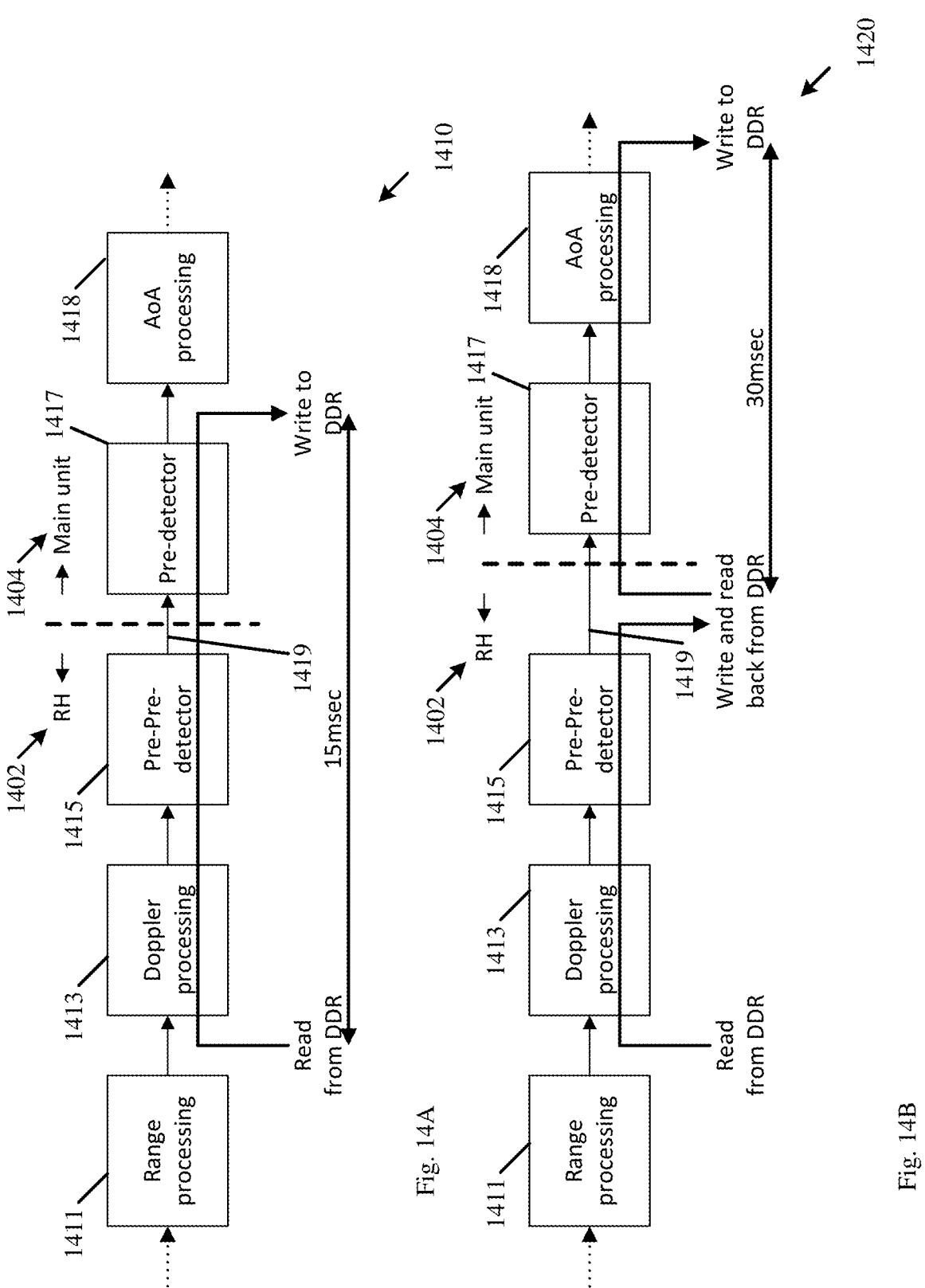
FIG. 14A is a schematic illustration of a processing path.
FIG. 14B is a schematic illustration of a processing path utilizing storage of filtered RD information at an RH memory, in accordance with some demonstrative aspects.

Reference is made to FIG. 14A, which schematically illustrates a processing path 1410, and to FIG. 14B, which schematically illustrates a processing path 1420 utilizing storage of filtered RD information at an RH memory, in accordance with some demonstrative aspects. For example, RH processor 1220 (FIG. 12) may be configured to implement one or more functionalities of the processing path 1410 and/or the processing path 1420.

In some demonstrative aspects, as shown in FIGS. 14A and 14B, processing path 1410 may be implemented to communicate the PPDET output data, e.g., filtered RD information 1213 (FIG. 12), for example, on-the-fly, e.g., without locally storing the PPDET output data at the RH.

For example, as shown in FIGS. 14A and 14B, an RH processor 1402, e.g., RH processor 1220 (FIG. 12), may be configured to perform one or more operations and/or functionalities of a range processing stage 1411, e.g., range processing stage 1106 (FIG. 11), a Doppler processing stage 1413, e.g., Doppler processing stage 1108 (FIG. 11), and/or a pre-PDET stage 1415, e.g., PPDET processing sub-stage 1161 (FIG. 11), e.g., as described above.

For example, as shown in FIGS. 14A and 14B, a radar processor 1404, e.g., radar processor 1034 (FIG. 10), may be configured to perform one or more operations and/or functionalities of a pre-detector stage 1417, e.g., PDET processing sub-stage 1163 (FIG. 11), an AoA processing stage 1418, e.g., AoA processing stage 1112 (FIG. 11), and/or one or more additional or alternative operations, e.g., as described above.

In some demonstrative aspects, filtered RD information 1419 from the pre-PDET stage 1415, e.g., filtered RD information 1213 (FIG. 12), may be sent to the radar processor 1404, for example, over a communication interconnect between RH 1402 and radar processor 1404, e.g., communication interconnect 1226 (FIG. 12), e.g., as described above.

In some demonstrative aspects, as shown in FIG. 14A, according to the processing path 1410, the filtered RD information 1419 may be sent from the RH 1402 to the radar processor 1404, for example, on-the-fly, e.g., without locally storing the filtered RD information 1419 at the RH 1402.

For example, as shown in FIG. 14A, according to the processing path 1410, there may be a relatively short time duration, e.g., 15 milliseconds (msec) or any other duration, between reading data from a memory, e.g., reading data for the Doppler processing stage 1413 from a local memory of the RH 1402, until storing processed data in a memory, e.g., storing processed data after the pre-detector stage 1417 at a local memory of the radar processor 1404.

In some demonstrative aspects, as shown in FIG. 14B, processing path 1420 may be configured to store the filtered RD information 1419 in a local memory of RH 1402, e.g., RH memory 1222 (FIG. 12).

For example, as shown in FIG. 14B, according to processing path 1420, the pre-PDET stage 1415 may be configured to store the filtered RD information 1419 in the local RH memory, e.g., RH memory 1222 (FIG. 12), for example, such that a communication interface of RH 1402 may retrieve the filtered RD information 1419 from the RH memory, for example, based on a bandwidth of the communication interconnect.

In some demonstrative aspects, processing path 1420 may be implemented, for example, to provide a technical solution to support a reduced data BW on the communication interconnect.

In some demonstrative aspects, processing path 1420 may be implemented, for example, to provide a technical solution to collect frame statistics at the PPDET stage 1415, e.g., while generating the filtered RD information 1419.

In some demonstrative aspects, processing path 1420 may be implemented, for example, to provide a technical solution to support storing, e.g., fully-storing, the filtered RD information 1419, e.g., including the filtered RD-bins, in the local RH memory of RH 1402, e.g., before passing the filtered RD information 1419 to radar processor 1404 over the communication interconnect.

In some demonstrative aspects, according to processing path 1420, the filtered RD information 1419, e.g., including the collected statistics, may be utilized at the radar processor 1404, for example, to perform the PDET, AoA and/or at least some of 4D-detector stages, for example, on-the-fly, e.g., even without intermediate storage in the memory of the radar processor 1404.

For example, a latency of performing the processing operations at radar processor 1404 on-the-fly may be, for example, longer than the latency of performing the PPDET processing stage 1415.

Accordingly, processing path 1420 may provide a technical solution to support transmission of the PPDET output data 1419, e.g., the same amount of PPDET output data 1419 as processing path 1410, over the communication interconnect, e.g., with increased latency, for example, with a reduced data BW over the communication interconnect, e.g., compared to the processing path 1410.

For example, as shown in FIG. 14B, according to the processing path 1420, the local storage of the PPDET output data 1419 in the local RH memory may provide a technical solution to support transmission of the PPDET output data 1419 over the communication interface with a relatively longer latency, e.g., a latency of 30 msec or any other latency.

Accordingly, the processing path 1420 may provide a technical solution to support a reduced data BW over the communication interconnect, e.g., compared to the processing path 1410. For example, by increasing the latency, e.g., from 15 msec to 30 msec, the data BW over the communication interconnect may be reduced, e.g., by half.

Figure 15:
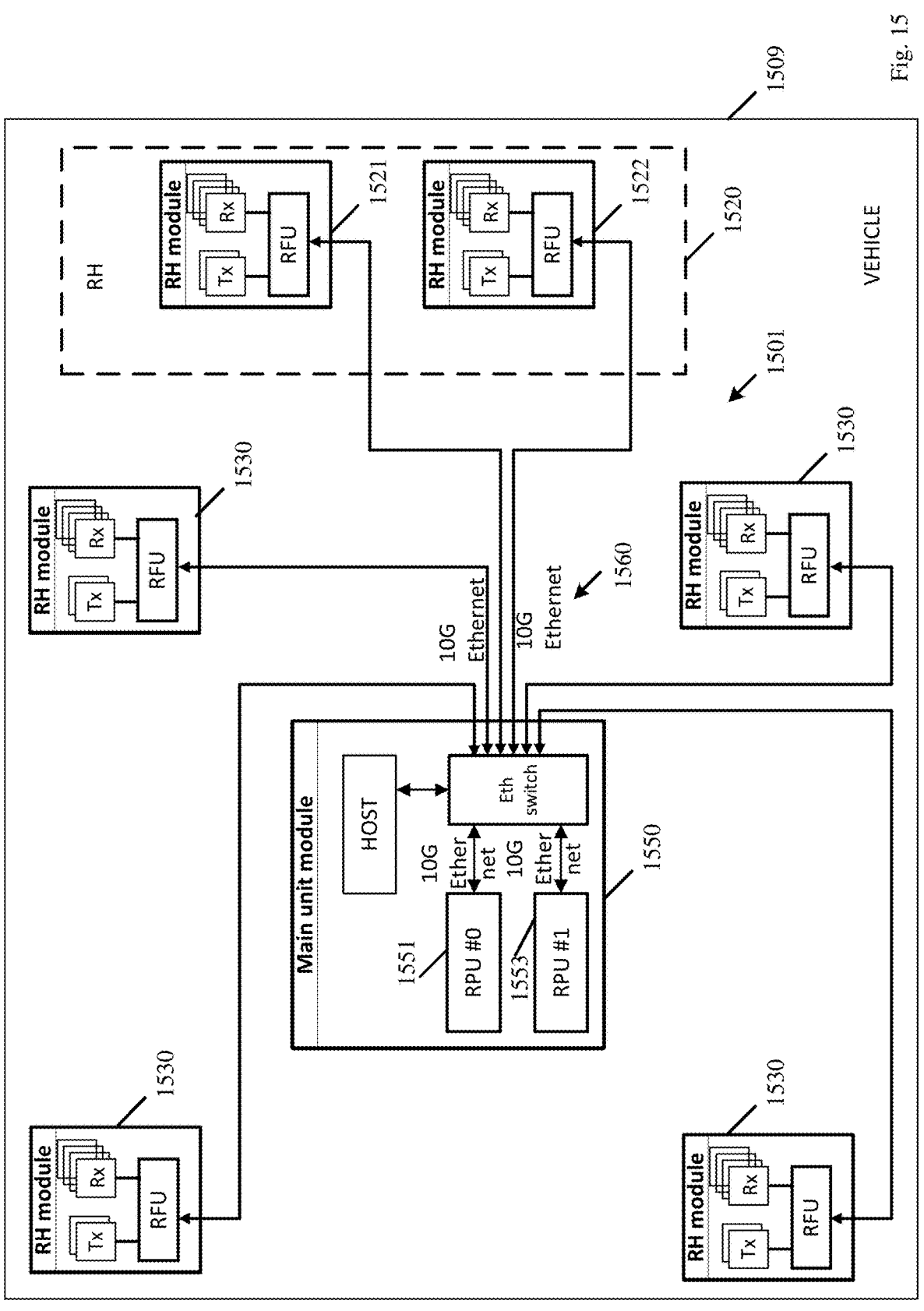
FIG. 15 is a schematic illustration of an implementation of a radar system in a vehicle, in accordance with some demonstrative aspects.

Reference is made to FIG. 15, which schematically illustrates an implementation of a radar system 1501 in a vehicle 1509, in accordance with some demonstrative aspects. For example, radar system 1001 (FIG. 10) may include one or more elements of radar system 1501, and/or may perform one or more operations and/or functionalities of radar system 1501.

In some demonstrative aspects, as shown in FIG. 15, radar system 1501 may include a plurality of radar RH devices, which may be implemented at a plurality of locations of the vehicle 1509.

For example, as shown in FIG. 15, radar system 1501 may include a front RH device 1520, which may be configured to communicate radar RF signals in a front FoV of the vehicle 1509.

For example, as shown in FIG. 15, front RH device 1520 may include a plurality of RHs, e.g., including a first RH 1521 and a second RH 1522. For example, front RH device 1520 may implement the plurality of RHs, for example, to provide a technical solution to support improved performance, resolution, and/or accuracy, e.g., using multi-static algorithms, or the like. In other aspects, front RH device 1520 may include any other number of RHs, e.g., one RH or more than two RHs.

For example, as shown in FIG. 15, radar system 1501 may include a plurality of additional RH devices, which may be configured to communicate radar RF signals in one or more additional FoVs of the vehicle 1509.

For example, as shown in FIG. 15, radar system 1501 may include a plurality of corner RH devices, for example, four corner RH devices 1530, which may be located substantially at corners of the vehicle 1509.

For example, as shown in FIG. 15, a corner RH device 1530 may include an RH. In other aspects, a corner RH device 1530 may include more than one RH.

In some demonstrative aspects, as shown in FIG. 15, an RH may include a plurality of Rx antennas, for example, 24 Rx antennas, e.g., implemented by 4 Rx System in Package (SIP) chips, and a plurality of Tx antennas, for example, 16 Tx antennas, e.g., implemented by 2 Tx SIP chips. For example, an RH may be utilized as a virtual antenna with 24*16 virtual antenna elements. In other aspects, an RH may include any other count and/or configuration of Rx antennas and/or Tx antennas.

In some demonstrative aspects, as shown in FIG. 15, radar system 1501 may include a radar processor 1550, which may include one or more processors configured to control the RH devices 1520 and/or 1530, and/or to process radar information communicated by the RH devices 1520 and/or 1530, e.g., as described below.

In some demonstrative aspects, radar processor 1550 may be configured to communicate with the RH devices 1520 and/or 1530, for example, via a communication interconnect 1560. In one example, as shown in FIG. 15, communication interconnect 1560 may include a 10G Ethernet interconnect. In other aspects, communication interconnect 1560 any other additional or alternative type of communication interconnect, e.g., according to any other suitable interconnect technology and/or supporting any other suitable data BW.

In some demonstrative aspects, as shown in FIG. 15, radar processor 1550 may include a plurality of processors, e.g., may be mapped to the RH devices 1520 and/or 1530, for example, based on one or more criteria, e.g., as described below.

In some demonstrative aspects, as shown in FIG. 15, radar processor 1550 may include a first processor 1551 (RF Unit (RFU) chip) which may be configured to control the RH device 1520, and/or to process radar information communicated by the RH device 1520.

In some demonstrative aspects, processor 1551 may be dedicated to process communications by the RHs of RH device 1520, e.g., to provide a relatively high performance for the front FoV.

For example, processor 1551 may be configured to accommodate a performance level required from a strongest radar, e.g., the front radar implemented by RH device 1520.

In some demonstrative aspects, as shown in FIG. 15, radar processor 1550 may include a second processor 1553 (RFU chip), which may be configured to control the RH devices 1530, and/or to process radar information communicated by the RH devices 1530.

In some demonstrative aspects, processor 1553 may be shared by the RH devices 1530.

For example, a performance required from corner radars, e.g., implemented by RH devices 1530, may usually relatively low, e.g., compared to the performance required from front radar.

For example, radar processing of the radar information communicated by RH device 1530 may consumes less resources, e.g., compute power, memory, power, or the like, e.g., compared to the radar processing of the front radar.

For example, as shown in FIG. 15, multiple RH devices 1530 of the corner radars may share the same RFU chip, e.g., processor 1553.

In some demonstrative aspects, the mapping of the processors 1551 and 1553 to the RH devices 1520 and 1530 may be configured to provide a technical solution to support a radar system having a reduced size and/or cheaper implementation.

In other aspects, radar system 1501 may be configured to include any other number, arrangement and/or configuration of RH devices, RHs, radar processors, and/or communication interconnects.

Figure 16:
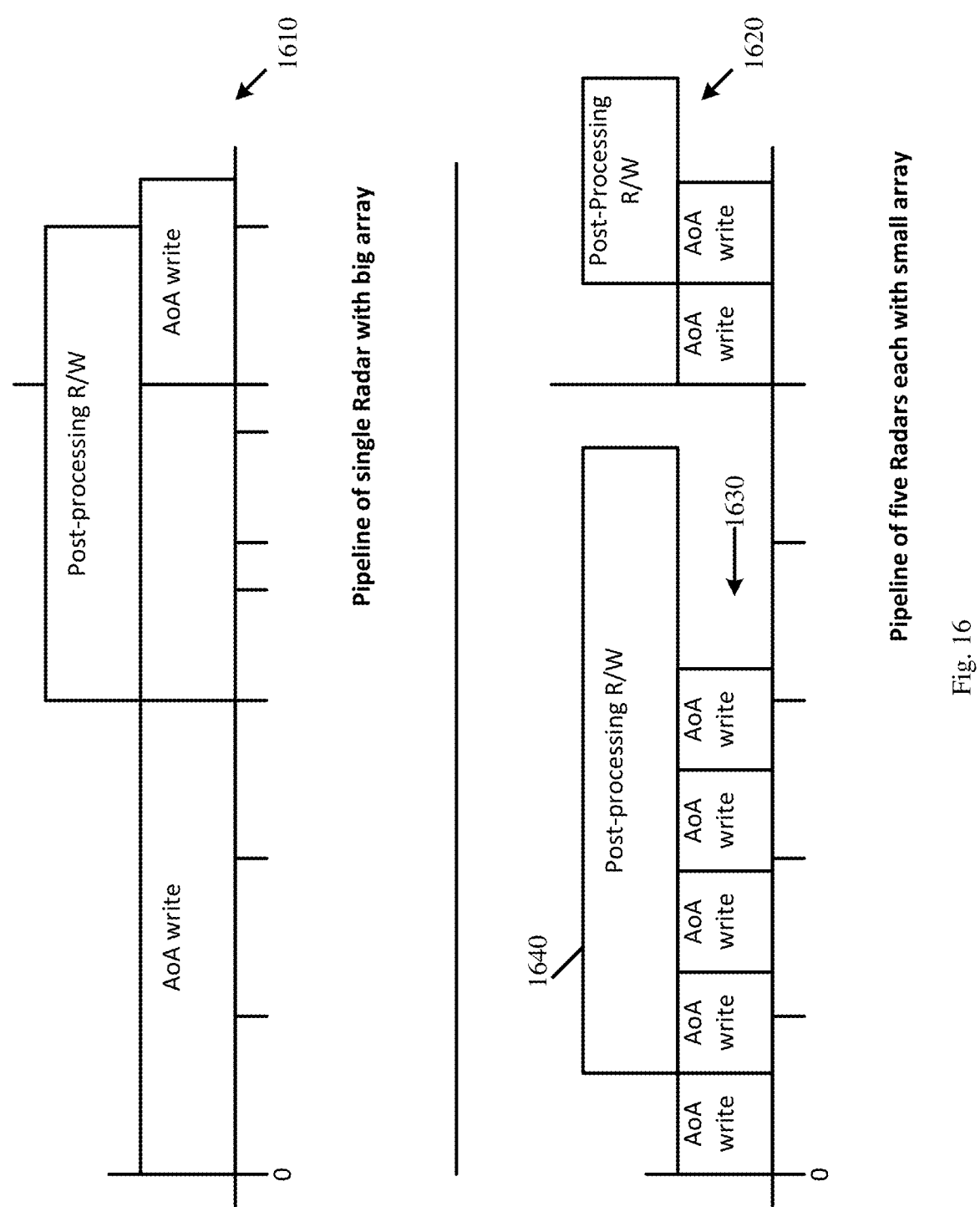
FIG. 16 is a schematic illustration of first and second radar processing pipelines, in accordance with some demonstrative aspects.

Reference is made to FIG. 16, which schematically illustrates a first radar processing pipeline 1610 of a first radar processor, and a second radar processing pipeline 1620 of a second radar processor, in accordance with some demonstrative aspects.

For example, radar processing pipeline 1610 and/or radar processing pipeline 1620 may represent processing pipelines from a memory BW perspective, e.g., a DDR BW perspective.

In one example, radar processing pipeline 1610 may represent a processing pipeline corresponding to a first radar processor, e.g., processor 1551 (FIG. 15), which is assigned to process radar information of a single first RH device, e.g., RH device 1520 (FIG. 15), for example, for a single front radar, e.g., as described above.

In one example, radar processing pipeline 1620 may represent a processing pipeline corresponding to a second radar processor, e.g., processor 1553 (FIG. 15), which is assigned to process radar information of a plurality of second RH devices, e.g., RH devices 1530 (FIG. 15), for example, for a plurality of corner radars, e.g., as described above. For example, as shown in FIG. 16, the plurality of corner radars may be operated in a time staggered fashion.

In some demonstrative aspects, as shown in FIG. 16, a compute latency of the second RH devices, e.g., of the corner radars, may be relatively lower, e.g., compared to the compute latency of the first RH device, e.g., of the front radar.

In some demonstrative aspects, the relatively low compute latency of the second RH devices, e.g., of the corner radars, may be utilized by the second radar processor, e.g., processor 1553 (FIG. 15), to process radar information 1630 of multiple radars, e.g., sequentially, for example, while still being able to meet a per-radar performance requirement, for example, a requirement for processing 20 radar Frames Per Second (FPS), e.g., a frame rate of 50 milliseconds (msec).

In some demonstrative aspects, as shown in FIG. 16, the second radar processor, e.g., processor 1553 (FIG. 15), may be configured to perform combined post-processing 1640 of the radar information for the plurality of corner radars.

In other aspects, the second radar processor, e.g., processor 1553 (FIG. 15), may be configured to perform post-processing of the radar information for each corner radar, e.g., separately.

Figure 17:
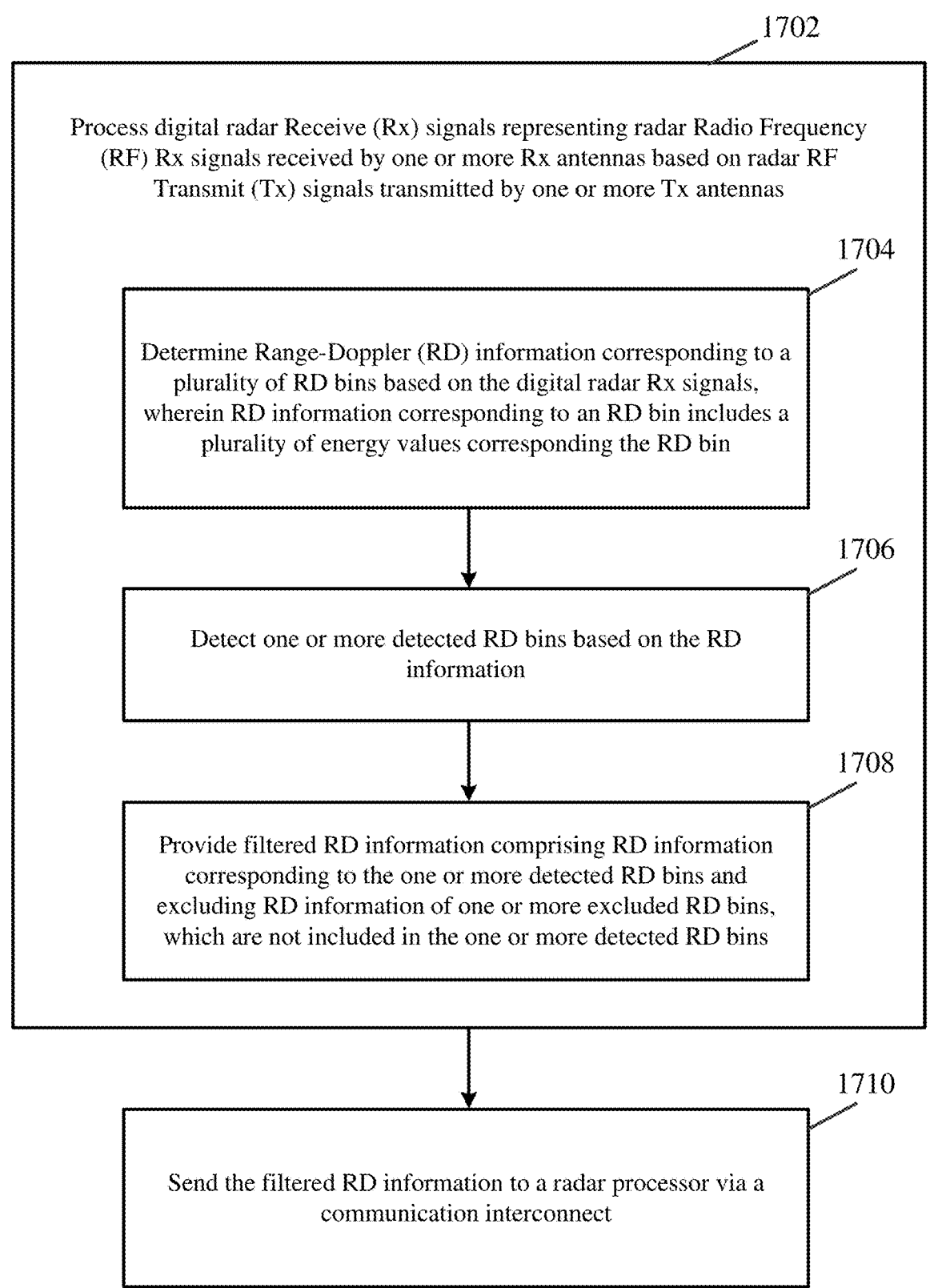
FIG. 17 is a schematic flow chart illustration of a method of radar data processing, in accordance with some demonstrative aspects.

Reference is made to FIG. 17, which schematically illustrates a method of a radar data processing, in accordance with some demonstrative aspects. For example, one or more of the operations of the method of FIG. 17 may be performed by a radar system, e.g., radar system 900 (FIG. 9), and/or radar system 1001 (FIG. 10); a RH, e.g., RH 1200 (FIG. 12); an RH processor, e.g., RH processor 1220 (FIG. 12), and/or a radar device, e.g., radar device 800 (FIG. 8).

As indicated at block 1702, the method may include processing digital radar Rx signals representing radar RF Rx signals received by one or more Rx antennas based on radar RF Transmit Tx signals transmitted by one or more Tx antennas. For example, RH processor 1220 (FIG. 12) may be configured to process digital radar Rx signals 1211 (FIG. 12) representing the radar RF Rx signals received by the one or more Rx antennas 1206 (FIG. 12), e.g., as described above.

As indicated at block 1704, the method may include determining RD information corresponding to a plurality of RD bins, for example, based on the digital radar Rx signals. For example, RD information corresponding to an RD bin may include a plurality of energy values corresponding the RD bin. For example, RH processor 1220 (FIG. 12) may be configured to determine RD information 1109 (FIG. 11), for example, based on the digital radar Rx signals 1211 (FIG. 12), e.g., as described above.

As indicated at block 1706, the method may include detecting one or more detected RD bins based on the RD information. For example, RH processor 1220 (FIG. 12) may be configured to detect the one or more detected bins, e.g., as described above.

As indicated at block 1708, the method may include providing filtered RD information, for example, including RD information corresponding to the one or more detected RD bins, and excluding RD information of one or more excluded RD bins, which are not included in the one or more detected RD bins. For example, RH processor 1220 (FIG. 12) may be configured to provide the filtered RD information 1213 (FIG. 12), e.g., as described above.

As indicated at block 1710, the method may include sending the filtered RD information to a radar processor via a communication interconnect. For example, communication interface 1224 (FIG. 12) may be configured to send the filtered RD information 1213 (FIG. 12) to radar processor 1034 (FIG. 10) via communication interconnect 1226 (FIG. 12), e.g., as described above.

Figure 18:
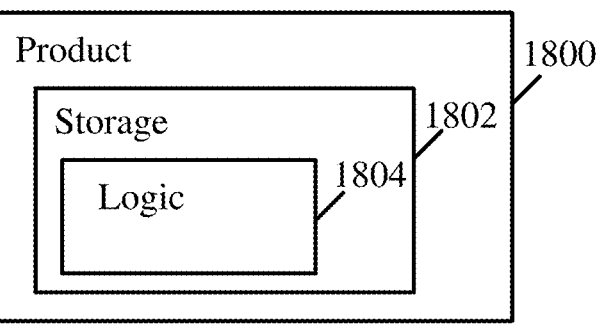
FIG. 18 is a schematic illustration of a product of manufacture, in accordance with some demonstrative aspects.

Reference is made to FIG. 18, which schematically illustrates a product of manufacture 1800, in accordance with some demonstrative aspects. Product 1800 may include one or more tangible computer-readable ("machine-readable") non-transitory storage media 1802, which may include computer-executable instructions, e.g., implemented by logic 1804, operable to, when executed by at least one computer processor, enable the at least one computer processor to implement one or more operations and/or functionalities described with reference to any of the FIGS. 1-17, and/or one or more operations described herein. The phrases "non-transitory machine-readable medium" and "computer-readable non-transitory storage media" may be directed to include all machine and/or computer readable media, with the sole exception being a transitory propagating signal.

In some demonstrative aspects, product 1800 and/or machine-readable storage media 1802 may include one or more types of computer-readable storage media capable of storing data, including volatile memory, non-volatile memory, removable or non-removable memory, erasable or non-erasable memory, writeable or re-writeable memory, and the like. For example, machine-readable storage media 1802 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), flash memory (e.g., NOR or NAND flash memory), content addressable memory (CAM), polymer memory, phase-change memory, ferroelectric memory, silicon-oxide-nitride-oxide-silicon (SONOS) memory, a disk, a hard drive, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 1804 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 1804 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, machine code, and the like.

EXAMPLES

The following examples pertain to further aspects.

Example 1 includes an apparatus comprising a Radio Head (RH) comprising an RH processor configured to process digital radar Receive (Rx) signals representing radar Radio Frequency (RF) Rx signals received by one or more Rx antennas based on radar RF Transmit (Tx) signals transmitted by one or more Tx antennas, wherein the RH processor is configured to determine Range-Doppler (RD) information corresponding to a plurality of RD bins based on the digital radar Rx signals, wherein RD information corresponding to an RD bin comprises a plurality of energy values, e.g., energy values corresponding the RD bin, wherein the RH processor is configured to detect one or more detected RD bins based on the RD information, and to provide filtered RD information comprising RD information corresponding to the one or more detected RD bins and excluding RD information of one or more excluded RD bins, which are not included in the one or more detected RD bins; and a communication interface configured to send the filtered RD information to another processor, e.g., a radar processor, via a communication interconnect.

Example 2 includes the subject matter of Example 1, and optionally, wherein the RH processor is configured to detect the one or more detected RD bins according to an azimuth-based detection criterion to detect potential targets along an azimuth axis.

Example 3 includes the subject matter of Example 1 or 2, and optionally, wherein the RH processor is configured to determine a plurality of azimuth-based values for the RD bin based on the plurality of energy values corresponding to the RD bin, and to determine whether or not the RD bin is to be included in the one or more detected RD bins based on a comparison between the plurality of azimuth-based values for the RD bin and a detection threshold value.

Example 4 includes the subject matter of Example 3, and optionally, wherein the RH processor is configured to determine the plurality of azimuth-based values for the RD bin based on a plurality of sets of Fast-Fourier-Transform (FFT) values for the RD bin, wherein the plurality of sets of FFT values for the RD bin corresponds to a respective plurality of antenna rows of a virtual antenna based on the one or more Tx antennas and the one or more Rx antennas, wherein a set of FFT values corresponding to an antenna row is based on a FFT applied to a set of energy values corresponding to a respective set of antenna elements in the antenna row.

Example 5 includes the subject matter of Example 4, and optionally, wherein the RH processor is configured to determine the plurality of azimuth-based values for the RD bin based on FFT values for a respective plurality of antenna columns of the virtual antenna, wherein an azimuth-based value corresponding to an antenna column is based on a summation of a set of absolute FFT values corresponding to the antenna column.

Example 6 includes the subject matter of Example 5, and optionally, wherein the azimuth-based value corresponding to the antenna column is based on a non-coherent summation of the set of absolute FFT values corresponding to the antenna column.

Example 7 includes the subject matter of any one of Examples 2-6, and optionally, wherein the RH processor is configured to determine that the RD bin is to be included in the one or more detected RD bins based on determination that at least one azimuth-based value of the plurality of azimuth-based values for the RD bin exceeds the detection threshold value.

Example 8 includes the subject matter of any one of Examples 2-7, and optionally, wherein the RH processor is configured to provide the filtered RD information comprising azimuth-based information for the plurality of RD bins, wherein the azimuth-based information comprises the plurality of azimuth-based values for the RD bin.

Example 9 includes the subject matter of any one of Examples 2-8, and optionally, wherein the detection threshold value is configured to provide the filtered RD information having a data bandwidth of less than 10 Giga-bit-per-second (Gbps).

Example 10 includes the subject matter of any one of Examples 1-9, and optionally, wherein the RH processor is configured to provide the filtered RD information comprising statistical information based on the RD information corresponding to the plurality of RD bins.

Example 11 includes the subject matter of any one of Examples 1-10, and optionally, wherein the RH comprises an RH memory, wherein the RH processor is configured to store the filtered RD information in the RH memory, wherein the communication interface is configured to retrieve the filtered RD information from the RH memory based on a bandwidth of the communication interconnect.

Example 12 includes the subject matter of any one of Examples 1-11, and optionally, wherein the plurality of energy values corresponding the RD bin comprises energy values corresponding to a plurality of virtual antenna elements based on the one or more Tx antennas and the one or more Rx antennas, wherein a virtual antenna element represents a combination of an Rx antenna and a Tx antenna.

Example 13 includes the subject matter of any one of Examples 1-12, and optionally, wherein the RH processor is configured to provide the filtered RD information having a data bandwidth of up to 10 Giga-bit-per-second (Gbps).

Example 14 includes the subject matter of any one of Examples 1-12, and optionally, wherein the RH processor is configured to provide the filtered RD information having a data bandwidth of up to 1 Giga-bit-per-second (Gbps).

Example 15 includes the subject matter of any one of Examples 1-14, and optionally, wherein the communication interface comprises a 10 Gigabit Ethernet (GbE) interface.

Example 16 includes the subject matter of any one of Examples 1-15, and optionally, wherein the communication interface comprises a Mobile Industry Processor Interface (MIPI).

Example 17 includes the subject matter of any one of Examples 1-16, and optionally, comprising one or more RF Rx chains to generate analog radar Rx signals based on the radar RF Rx signals; and an Analog to Digital Converter (ADC) to generate the digital radar Rx signals based on the analog radar Rx signals.

Example 18 includes the subject matter of Example 17, and optionally, comprising one or more RF Tx chains to transmit the radar RF Tx signals via the one or more Tx antennas.

Example 19 includes a radar system comprising the apparatus of any of Examples 1-18.

Example 20 includes a vehicle comprising the system of any of Examples 1-19.

Example 21 includes an apparatus comprising means for performing any of the described operations of any of Examples 1-18.

Example 22 includes a machine-readable medium that stores instructions for execution by a processor to perform any of the described operations of any of Examples 1-18.

Example 23 comprises a product comprising one or more tangible computer-readable non-transitory storage media comprising computer-executable instructions operable to, when executed by at least one processor, enable the at least one processor to cause a device to perform any of the described operations of any of Examples 1-18.

Example 24 includes an apparatus comprising a memory; and processing circuitry configured to perform any of the described operations of any of Examples 1-18.

Example 25 includes a method comprising any of the described operations of any of Examples 1-18.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:

a Radio Head (RH) comprising:

an RH processor configured to process digital radar Receive (Rx) signals representing radar Radio Frequency (RF) Rx signals received by one or more Rx antennas based on radar RF Transmit (Tx) signals transmitted by one or more Tx antennas, wherein the RH processor is configured to determine Range-Doppler (RD) information corresponding to a plurality of RD bins based on the digital radar Rx signals, wherein the RD information corresponding to an RD bin of the plurality of RD bins comprises a plurality of energy values, wherein the RH processor is configured to detect one or more detected RD bins of the plurality of RD bins based on the RD information corresponding to the plurality of RD bins, wherein the RH processor is configured to determine a plurality of azimuth-based values for the RD bin based on the plurality of energy values of the RD bin, and to determine whether or not the RD bin is to be included in the one or more detected RD bins based on a comparison between the plurality of azimuth-based values for the RD bin and a detection threshold value, the RH processor is configured to provide filtered RD information comprising the RD information corresponding to the one or more detected RD bins and excluding the RD information corresponding to one or more excluded RD bins of the plurality of RD bins, which are not included in the one or more detected RD bins, the RH processor is to configure the filtered RD information to include the RD information corresponding to the RD bin based on a determination that the RD bin is to be included in the one or more detected RD bins; and a communication interface configured to send the filtered RD information to another processor via a communication interconnect.

2. The apparatus of claim 1, wherein the RH processor is configured to detect the one or more detected RD bins according to an azimuth-based detection criterion to detect potential targets along an azimuth axis.

3. The apparatus of claim 1, wherein the RH processor is configured to determine the plurality of azimuth-based values for the RD bin based on a plurality of sets of Fast-Fourier-Transform (FFT) values for the RD bin, wherein the plurality of sets of FFT values for the RD bin corresponds to a respective plurality of antenna rows of a virtual antenna based on the one or more Tx antennas and the one or more Rx antennas, wherein a set of FFT values corresponding to an antenna row is based on a FFT applied to a set of energy values corresponding to a respective set of antenna elements in the antenna row.

4. The apparatus of claim 3, wherein the RH processor is configured to determine the plurality of azimuth-based values for the RD bin based on FFT values for a respective plurality of antenna columns of the virtual antenna, wherein an azimuth-based value corresponding to an antenna column is based on a summation of a set of absolute FFT values corresponding to the antenna column.

5. The apparatus of claim 4, wherein the azimuth-based value corresponding to the antenna column is based on a non-coherent summation of the set of absolute FFT values corresponding to the antenna column.

6. The apparatus of claim 1, wherein the RH processor is configured to determine that the RD bin is to be included in the one or more detected RD bins based on determination that at least one azimuth-based value of the plurality of azimuth-based values for the RD bin exceeds the detection threshold value.

7. The apparatus of claim 1, wherein the RH processor is configured to provide the filtered RD information comprising azimuth-based information for the plurality of RD bins, wherein the azimuth-based information comprises the plurality of azimuth-based values for the RD bin.

8. The apparatus of claim 1, wherein the detection threshold value is configured to provide the filtered RD information having a data bandwidth of less than 10 Giga-bit-per-second (Gbps).

9. The apparatus of claim 1, wherein the RH processor is configured to provide the filtered RD information comprising statistical information based on the RD information corresponding to the plurality of RD bins.

10. The apparatus of claim 1, wherein the RH comprises an RH memory, wherein the RH processor is configured to store the filtered RD information in the RH memory, wherein the communication interface is configured to retrieve the filtered RD information from the RH memory based on a bandwidth of the communication interconnect.

11. The apparatus of claim 1, wherein the plurality of energy values comprises energy values corresponding to a plurality of virtual antenna elements based on the one or more Tx antennas and the one or more Rx antennas, wherein a virtual antenna element of the plurality of virtual antenna elements represents a combination of an Rx antenna and a Tx antenna.

12. The apparatus of claim 1, wherein the RH processor is configured to provide the filtered RD information having a data bandwidth of up to 10 Giga-bit-per-second (Gbps).

13. The apparatus of claim 1, wherein the RH processor is configured to provide the filtered RD information having a data bandwidth of up to 1 Giga-bit-per-second (Gbps).

14. The apparatus of claim 1, wherein the communication interface comprises a 10 Gigabit Ethernet (GbE) interface.

15. The apparatus of claim 1, wherein the communication interface comprises a Mobile Industry Processor Interface (MIPI).

16. The apparatus of claim 1 comprising:

one or more RF Rx chains to generate analog radar Rx signals based on the radar RF Rx signals; and an Analog to Digital Converter (ADC) to generate the digital radar Rx signals based on the analog radar Rx signals.

17. The apparatus of claim 16 comprising one or more RF Tx chains to transmit the radar RF Tx signals via the one or more Tx antennas.

18. A system comprising:

one or more Radio Heads (RHs), wherein a RH of the one or more RHs comprises:

an RH processor configured to process digital radar Receive (Rx) signals representing radar Radio Frequency (RF) Rx signals received by one or more Rx antennas based on radar RF Transmit (Tx) signals transmitted by one or more Tx antennas, wherein the RH processor is configured to determine Range-Doppler (RD) information corresponding to a plurality of RD bins based on the digital radar Rx signals, wherein the RD information corresponding to an RD bin of the plurality of RD bins comprises a plurality of energy values, wherein the RH processor is configured to detect one or more detected RD bins of the plurality of RD bins based on the RD information corresponding to the plurality of RD bins, wherein the RH processor is configured to determine a plurality of azimuth-based values for the RD bin based on the plurality of energy values of the RD bin, and to determine whether or not the RD bin is to be included in the one or more detected RD bins based on a comparison between the plurality of azimuth-based values for the RD bin and a detection threshold value, the RH processor is configured to provide filtered RD information comprising the RD information corresponding to the one or more detected RD bins and excluding the RD information corresponding to one or more excluded RD bins of the plurality of RD bins, which are not included in the one or more detected RD bins, the RH processor is to configure the filtered RD information to include the RD information corresponding to the RD bin based on a determination that the RD bin is to be included in the one or more detected RD bins; and a communication interface configured to send the filtered RD information over a communication interconnect; and another processor configured to receive the filtered RD information via the communication interconnect, and to generate radar information based on the filtered RD information.

19. The system of claim 18 comprising a vehicle, the vehicle comprising a system controller configured to control one or more vehicular systems of the vehicle based on the radar information.

\* \* \* \* \*